(12) United States Patent
Akutsu et al.

(10) Patent No.: US 10,518,672 B2
(45) Date of Patent: Dec. 31, 2019

(54) VEHICLE SEAT

(71) Applicant: TS TECH CO., LTD., Asaka-shi, Saitama (JP)

(72) Inventors: Takeshi Akutsu, Tochigi (JP); Taro Murayama, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 16 days.

(21) Appl. No.: 16/035,775

(22) Filed: Jul. 16, 2018

(65) Prior Publication Data

US 2018/0326879 A1 Nov. 15, 2018

Related U.S. Application Data

(63) Continuation of application No. 15/124,750, filed as application No. PCT/JP2015/054825 on Feb. 20, 2015, now Pat. No. 10,023,081.

(30) Foreign Application Priority Data

Mar. 13, 2014 (JP) .................................. 2014-049934

(51) Int. Cl.
*B60N 2/20* (2006.01)
*B60N 2/30* (2006.01)
(Continued)

(52) U.S. Cl.
CPC ........... *B60N 2/3013* (2013.01); *B60N 2/015* (2013.01); *B60N 2/305* (2013.01); *B60N 2/309* (2013.01);
(Continued)

(58) Field of Classification Search
CPC .... B60N 2/3013; B60N 2/015; B60N 2/3047; B60N 2/305; B60N 2/309; B60N 2/68;
(Continued)

(56) References Cited

U.S. PATENT DOCUMENTS 5,711,505 A 1/1998 Nemoto
6,561,583 B2 5/2003 Glaser
(Continued)

FOREIGN PATENT DOCUMENTS

JP H11-059240 A 3/1999
JP H11-105598 A 4/1999
(Continued)

OTHER PUBLICATIONS

Office Action issued in related application JP 2017-239896, dated Oct. 30, 2018, with machine generated English language translation, 8 pages.

*Primary Examiner* — Syed A Islam

(74) *Attorney, Agent, or Firm* — Drinker Biddle & Reath LLP

(57) ABSTRACT

A vehicle seat capable of housing a seat main body includes a seat pivot shaft to which the seat main body is connected to be pivotable, and a detachable leg whose upper end is mounted to the seat main body and whose lower end is detachably held onto a leg holding member on a vehicle body floor. When the seat main body moves from a housed state side to a usage state side, a leg guide portion causes a cushion abutting portion to abut a base abutting portion in advance, thereby guiding the detachable leg moving together with the seat main body to pass above a leg movement inhibiting portion which is a portion of a support base.

20 Claims, 14 Drawing Sheets

<LEG GUIDE SECTION>

(51) Int. Cl.
*B60N 2/015* (2006.01)
*B60N 2/68* (2006.01)
*B60N 2/07* (2006.01)

(52) U.S. Cl.
CPC ............. *B60N 2/3047* (2013.01); *B60N 2/68* (2013.01); *B60N 2/0725* (2013.01); *B60N 2/20* (2013.01); *B60N 2/206* (2013.01); *B60N 2/3004* (2013.01); *B60N 2/3009* (2013.01)

(58) Field of Classification Search
CPC ........ B60N 2/20; B60N 2/206; B60N 2/3004; B60N 2/3009; B60N 2/0725
USPC ......................................................... 297/331
See application file for complete search history.

(56) References Cited

U.S. PATENT DOCUMENTS

| | | | |
|---|---|---|---|
| 6,817,660 B2 | 11/2004 | Ito et al. | |
| 6,830,295 B2 | 12/2004 | Duquesnay et al. | |
| 7,100,984 B2 | 9/2006 | Epaud et al. | |
| 7,731,296 B2 | 6/2010 | Tsuda et al. | |
| 8,251,450 B2 | 8/2012 | Carroll et al. | |
| 9,604,552 B2 * | 3/2017 | Akutsu | B60N 2/3013 |
| 9,676,299 B2 | 6/2017 | Fukutani et al. | |
| 9,789,789 B2 * | 10/2017 | Akutsu | B60N 2/06 |
| 9,827,880 B2 | 11/2017 | Fukutani et al. | |
| 9,884,571 B2 * | 2/2018 | Akutsu | B60N 2/06 |
| 9,987,954 B2 * | 6/2018 | Kimata | B60N 2/68 |
| 2006/0152055 A1 | 7/2006 | Yudovich | |
| 2009/0072595 A1 | 3/2009 | Tsuda et al. | |
| 2009/0295185 A1 | 12/2009 | Abe et al. | |
| 2010/0032976 A1 | 2/2010 | Yamashita et al. | |
| 2011/0121628 A1 | 5/2011 | Kauffman et al. | |
| 2014/0265498 A1 | 9/2014 | Shiotani et al. | |
| 2016/0046210 A1 | 2/2016 | Nakamura et al. | |
| 2017/0313215 A1 * | 11/2017 | Akutsu | B60N 2/06 |

FOREIGN PATENT DOCUMENTS

| | | |
|---|---|---|
| JP | 2006-056416 A | 3/2006 |
| JP | 2008-184102 A | 8/2008 |
| JP | 2009-067234 A | 4/2009 |
| JP | 2009-067309 A | 4/2009 |
| JP | 2010-234942 A | 10/2010 |
| JP | 2010-269688 A | 12/2010 |
| JP | 2011-046322 A | 3/2011 |
| JP | 2011-521715 A | 7/2011 |
| JP | 2013-199234 A | 10/2013 |
| WO | 2009/154909 A1 | 12/2009 |

* cited by examiner

<LEG GUIDE SECTION>

<SEAT HOUSING ACTION>

<SEAT TIP-UP ACTION>

<SEAT RETURN ACTION>

<SEAT RETURN ACTION (ONE-MOTION ACTION)>

VEHICLE SEAT

CROSS-REFERENCE TO RELATED APPLICATIONS

This application is a continuation of U.S. patent application Ser. No. 15/124,750, filed Sep. 9, 2016 and now issued as U.S. Pat. No. 10,023,081, which is a National Stage Entry application of PCT Application No. PCT/JP2015/054825, filed Feb. 20, 2015, which claims the priority benefit of Japanese Patent Application No. JP2014-049934, filed Mar. 13, 2014, the contents of each being incorporated herein by reference.

BACKGROUND

The present disclosure relates to a vehicle seat and, more specifically, to a vehicle seat capable of housing a seat back and a seat cushion in a position lower than a vehicle body floor.

Conventionally, vehicle seats capable of housing a seat back and a seat cushion which constitute a seat main body in a housing floor formed at a position lower than a vehicle body floor are already known, and among them, vehicle rear seats capable of housing a seat main body to be folded forward in a housing floor provided in front of the seat exist, for example, see Japanese Patent Publication JP 2009-067309 ("the '309 Publication").

The vehicle seat described in the '309 Publication includes a housing structure consisting of a mounting shaft mounted to a vehicle body floor and supporting a seat back pivotally, and a leg member whose upper end supports the front portion of a seat cushion and whose lower end is pivotally held in a holding groove fixed to a housing floor. At the time of a housing operation of a seat main body, the seat back rotates to move the seat cushion to the housing floor with respect to the vehicle body floor, and the leg member rotates around the holding groove in conjunction with the seat back, thereby capable of housing the seat main body in the housing floor. Moreover, the vehicle seat is configured to be capable of switching from a usage state that an occupant can sit to a tip-up state that the seat cushion is flipped up after detaching the leg member from the holding groove.

In the seat capable of housing the seat main body in the housing floor, like the '309 Publication, the leg member supporting the seat cushion was a long member because of being connected between the seat cushion and the housing floor. Then, when attaching and detaching the leg member to and from the holding groove in a switching operation of a usage state and a tip-up state, the deflection width in the front to back direction of the detached leg member is increased due to a long total length of the leg member, so an operation of attaching the leg member to the holding groove was made difficult. In particular, when the seat main body is somewhat roughly handled during a switching operation thereof, the moving action of the leg member was affected by such as the contact of the moving leg member with a portion of the seat, thereby making the operation of reattaching the leg member to the holding groove more difficult. Thus, a vehicle seat in which a switching operation from a usage state is easy has been demanded.

Moreover, in the seat like the '309 Publication, component parts such as the leg member and the holding groove for supporting the seat back rotatably are mounted not only on the vehicle body floor surface on which the seat main body is installed but also on the housing floor surface, which complicated the housing structure for housing the seat main body. Therefore, a vehicle seat capable of being housed in a housing floor with a simple structure has been demanded. Moreover, a vehicle seat capable of securing a wide housing space has been demanded.

SUMMARY

The present disclosure is achieved in consideration of the above problems, and at least some embodiments of the present disclosure provide a vehicle seat in which a switching operation from a usage state is easier. Moreover, some embodiments of the present disclosure provide a vehicle seat capable of being housed in a housing floor with a simple structure. Moreover, an embodiment of the present disclosure provides a vehicle seat capable of securing a wide housing space without disposing component parts of a housing structure on a housing floor surface.

In accordance with a vehicle seat of an embodiment of the present disclosure, the above problems are solved by the vehicle seat including a seat main body having a seat back which is a backrest portion, and a seat cushion which is connected to the seat back and is a seating portion, and capable of switching between a usage state where an occupant can sit and a movement state where the seat main body is moved from the usage state, the vehicle seat including: a seat pivot shaft provided on a vehicle body floor and connected to one end side of the seat main body in the seat front to back direction so that the seat main body is pivotable; a detachable leg whose upper end portion is mounted to the other end side of the seat main body in the seat front to back direction and whose lower end portion is detachably held onto a leg holding member provided on the vehicle body floor; and a leg guide portion guiding the detachable leg detached from the leg holding member in association with the movement of the seat main body, in which when the seat main body moves between the movement state and the usage state, the leg guide portion guides the detachable leg moving together with the seat main body not to contact a leg movement inhibiting portion which is a portion of the vehicle seat.

As described above, when the seat main body moves between the movement state and the usage state, the leg guide portion guides the detachable leg to move together with the seat main body so the detachable leg does not contact the leg movement inhibiting portion which is a portion of the vehicle seat, so the moving action of the detachable leg becomes smooth, and the detachable leg can be successfully attached and detached to and from the leg holding member. Therefore, a vehicle seat in which a switching operation from a usage state is easy is provided. Then, the leg holding member is arranged on the vehicle body floor side rather than the housing floor in conventional manner, so it is possible to reduce the total length of the detachable leg. The deflection width in the front to back direction of the detachable leg is reduced by a degree of smallness of the total length of the detachable leg, so the detachable leg is easily held by the leg holding member. Therefore, a switching operation from the usage state is facilitated. Then, the seat pivot shaft, the leg holding member, and the detachable leg are all arranged on the vehicle body floor side, so the seat main body becomes movable with a simple structure.

In an embodiment, the movement state is a housed state where the seat main body is moved to a position lower than the vehicle body floor, the seat pivot shaft is connected to the seat rear end side of the seat main body, the detachable leg is mounted to the seat front end side of the seat main body at the upper end portion thereof, and the leg guide portion guides the detachable leg when the seat main body moves from the housed state side to the usage state side. According to the above configuration, the leg guide portion guides the detachable leg when moving the seat main body from the housed state side to the usage state side, in other words, when moving the detachable leg to the leg holding member side, so a switching operation is improved. Then, component parts of a housing structure are all arranged on the vehicle body floor side, so it is possible to secure a wide housing space on the housing floor.

In an embodiment, the vehicle seat includes a support base which is provided on the vehicle body floor and to which the seat pivot shaft is mounted, and the leg holding member is mounted on the support base. According to the above configuration, the seat pivot shaft and the leg holding member are mounted on the support base having relatively high support rigidity of the vehicle seat, so mounting rigidity of the seat pivot shaft and the leg holding member is increased.

In an embodiment, when the seat main body moves from the movement state side to the usage state side, the leg guide portion guides the detachable leg to pass above the leg movement inhibiting portion which is a portion of the support base. Moreover, in an embodiment, the leg guide portion causes a cushion abutting portion provided at a position on the leg holding member side relative to the detachable leg in the seat cushion to abut a base abutting portion provided to the support base. Moreover, in an embodiment, when the cushion abutting portion abuts the base abutting portion, the detachable leg is located on the opposite side to the leg holding member side with respect to the leg movement inhibiting portion. According to the above configuration, the detachable leg can be successfully guided using the seat cushion and the support base which are existing component parts. In other words, when moving the seat main body from the housed state side to the movement state side, the cushion abutting portion and the base abutting portion are abutted in advance, thereby capable of guiding the detachable leg to pass above the leg movement inhibiting portion.

In an embodiment, the support base includes a base cover covering the support base from the outside of the support base, the base abutting portion is provided on a surface on the seat cushion side of the base cover, the seat cushion includes a cushion cover covering the seat cushion from the outside of the seat cushion, and the cushion abutting portion provided to project to a surface on the base cover side of the cushion cover is arranged overlapping with the base abutting portion in the seat width direction. According to the above configuration, the detachable leg can be successfully guided using the base cover and the cushion cover which are existing component parts.

In an embodiment, at least one abutting surface of the cushion abutting portion and the base abutting portion is formed into a convex curved surface. Moreover, in an embodiment, one abutting surface of the cushion abutting portion and the base abutting portion has a lower coefficient of friction than the other abutting surface. According to the above configuration, when the cushion abutting portion and the base abutting portion abut, it is possible to suppress scratches or damage to each other.

In an embodiment, the movement state is a housed state where the seat main body is moved to a position formed in front of the seat lower than the vehicle body floor, and the leg guide portion causes the cushion abutting portion arranged at the rear of the seat relative to the detachable leg in the seat cushion to abut the base abutting portion provided at the seat front end portion of the base cover, thereby guiding the detachable leg to pass above the leg movement inhibiting portion provided at the seat front end portion of the base cover. According to the above configuration, when moving the seat main body from the housed state side to the movement state side, it is possible to guide the detachable leg moving together with the seat main body to pass above the leg movement inhibiting portion located at the seat front end portion of the base cover.

In an embodiment, the vehicle seat includes a cushion frame serving as a framework of the seat cushion, the cushion frame includes right and left side frames arranged on the sides of the seat, and a connecting frame connecting the right and left side frames, and the cushion abutting portion is arranged in a portion corresponding to the side frames in the seat cushion. According to the above configuration, the cushion abutting portion abutting the base abutting portion is arranged in a portion with relatively increased support rigidity corresponding to the side frames in the seat cushion.

In an embodiment, the movement state is a housed state that the seat main body is moved to a position formed in front of the seat lower than the vehicle body floor, the vehicle seat includes a cushion pivoting device connecting the seat cushion with respect to the seat back pivotally, and a lock-off device provided in the seat cushion and having a lock-off lever capable of switching the cushion pivoting device from a lock state to an unlock state, and when the lock-off lever, moving together with the seat cushion, abuts a lever abutting portion provided to the support base, the cushion abutting portion is located in front of the seat with respect to the base abutting portion. According to the above configuration, when moving the seat main body from the housed state side to the usage state side, the lock-off lever abuts the lever abutting portion in advance before the cushion abutting portion serving as the leg guide portion abuts the base abutting portion, so it is possible to mitigate the impact associated with the abutment of the cushion abutting portion and the base abutting portion. Moreover, by unlocking of the lock-off device, the seat cushion is switched to a state pivotable with respect to the seat back, so it is possible to further mitigate the impact associated with the abutment of the cushion abutting portion provided to the seat cushion and the base abutting portion.

According to an embodiment of the present disclosure, the moving action of the detachable leg becomes smooth by the leg guide portion, the detachable leg can be successfully attached and detached to and from the leg holding member, and therefore, a vehicle seat in which a switching operation from a usage state is easy is provided. Then, the leg holding member is arranged on the vehicle body floor side, so it is possible to reduce the total length of the detachable leg. The deflection width in the front to back direction of the detachable leg is reduced by a degree of smallness of the total length of the detachable leg, so the detachable leg is easily held by the leg holding member. Therefore, the switching operation from the usage state is facilitated. Then, the seat pivot shaft, the leg holding member, and the detachable leg are all arranged on the vehicle body floor side, so the seat main body becomes movable with a simple structure.

According to an embodiment of the present disclosure, component parts of the housing structure are all arranged on the vehicle body floor side, so it is possible to secure a wide housing space on the housing floor. According to the present disclosure, mounting rigidity of the seat pivot shaft and the leg holding member is increased. According to an embodiment of the present disclosure, the detachable leg can be successfully guided using the seat cushion and the support base which are existing component parts.

According to an embodiment of the present disclosure, the detachable leg can be successfully guided using the base cover and the cushion cover which are existing component parts. According to an embodiment of the present disclosure, when the cushion abutting portion and the base abutting portion abut, it is possible to suppress scratches or damage to each other. According to an embodiment of the present disclosure, the cushion abutting portion abutting the base abutting portion is arranged in a portion with relatively increased support rigidity corresponding to the side frames in the seat cushion.

According to an embodiment of the present disclosure, when moving the seat main body from the housed state side to the usage state side, the lock-off lever abuts the lever abutting portion in advance before the cushion abutting portion serving as the leg guide portion abuts the base abutting portion, so it is possible to mitigate the impact associated with the abutment of the cushion abutting portion and the base abutting portion. Moreover, by unlocking of the lock-off device, the seat cushion is switched to a state pivotable with respect to the seat back, so it is possible to further mitigate the impact associated with the abutment of the cushion abutting portion provided to the seat cushion and the base abutting portion.

BRIEF DESCRIPTION OF DRAWINGS

Various embodiments of the invention are illustrated in the drawings, in which.

DETAILED DESCRIPTION

Various embodiments of the present disclosure relate to a vehicle seat capable of housing a seat main body in a housing floor, including a seat pivot shaft connected so that the seat main body is pivotable, and a detachable leg whose upper end is mounted to the seat main body and whose lower end is detachably held onto a leg holding member on a vehicle body floor, in which when the seat main body moves from a housed state side to a usage state side, a leg guide portion causes a cushion abutting portion to abut a base abutting portion in advance, thereby guiding the detachable leg moving together with the seat main body to pass above a leg movement inhibiting portion which is a portion of a support base. It should be noted that the side on which an occupant sits with respect to a seat back of the vehicle seat is a seat front side.

Figure 1:
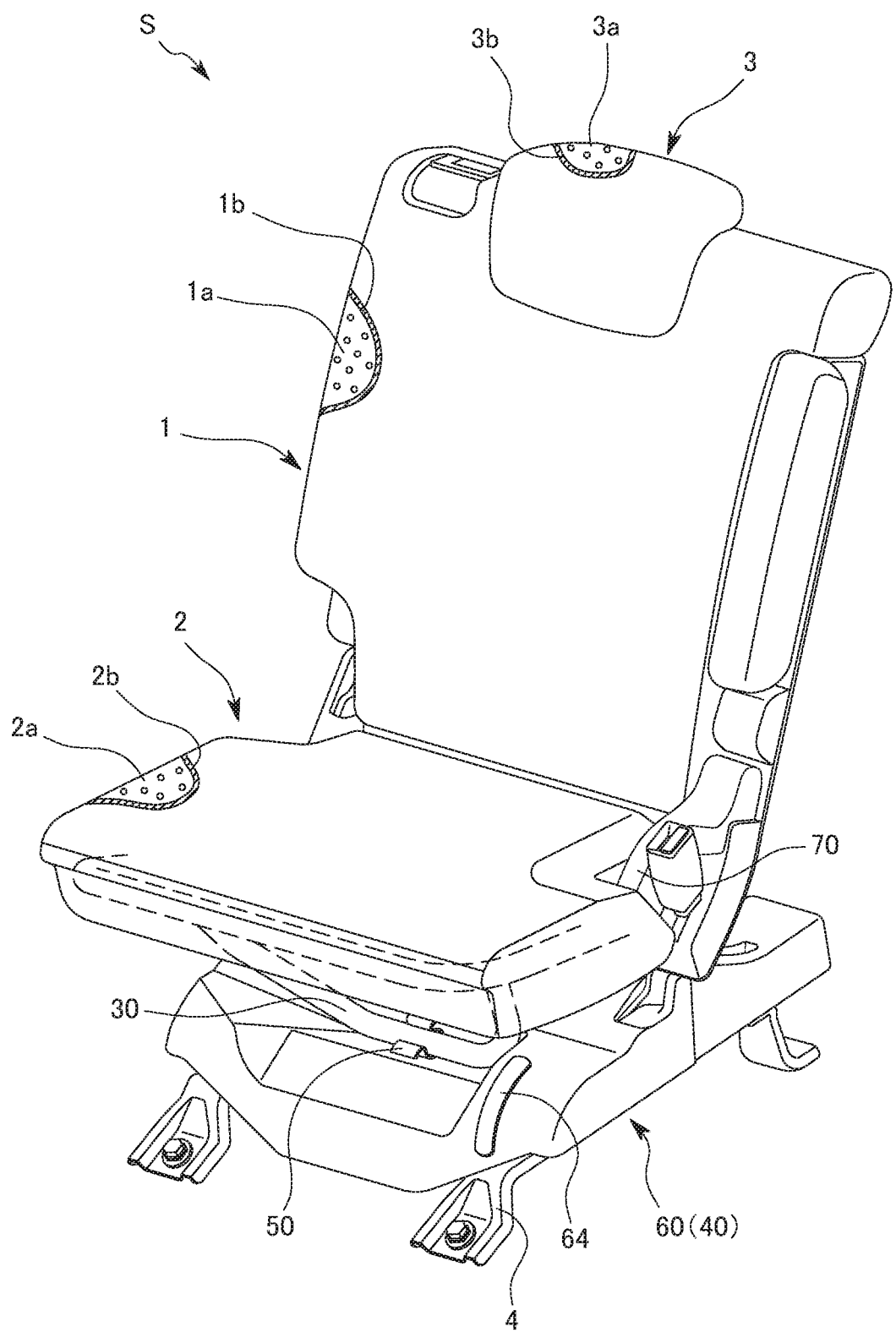
FIG. 1 is a perspective view of a vehicle seat according to an embodiment.
Figure 2:
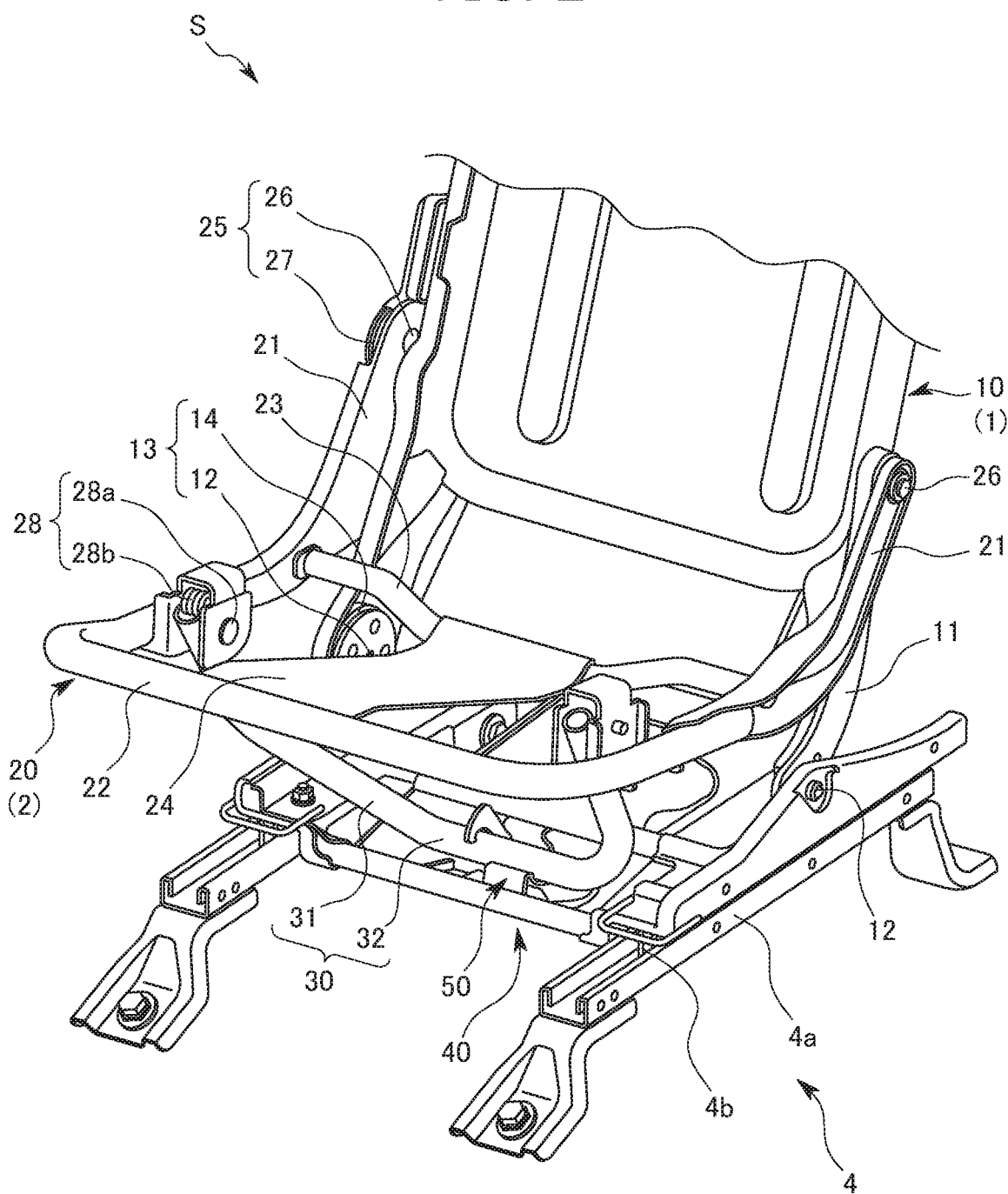
FIG. 2 is a perspective view of a seat frame serving as a framework of the vehicle seat, according to an embodiment.
Figure 8A:
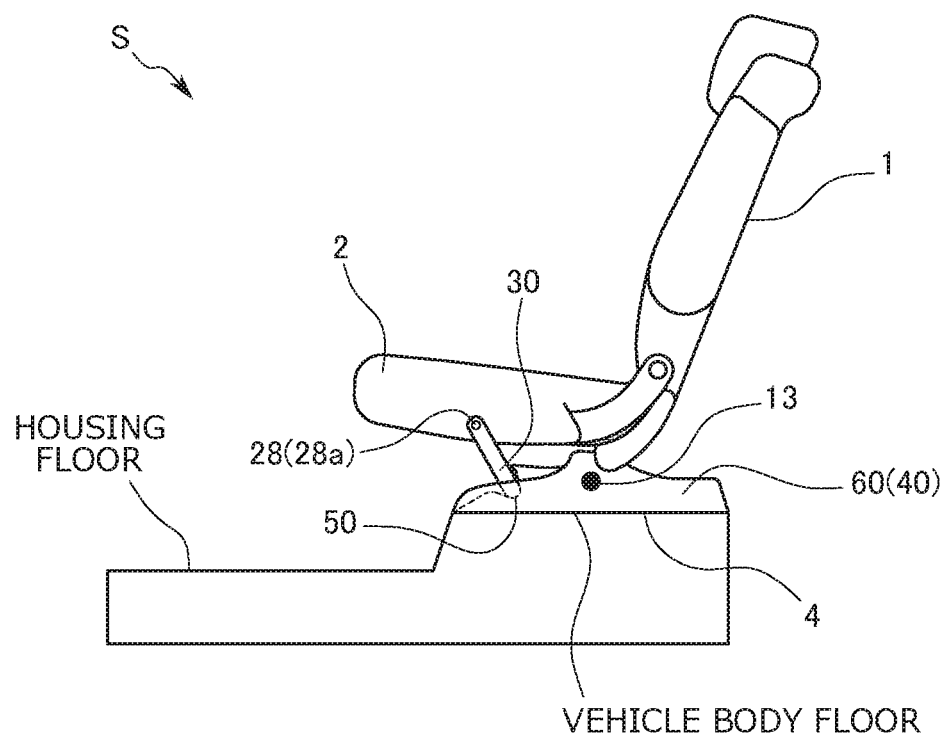
FIG. 8A and FIG. 8B are side views of the vehicle seat and illustrate a moving action from a usage state to a housed state, according to an embodiment.
Figure 8B:
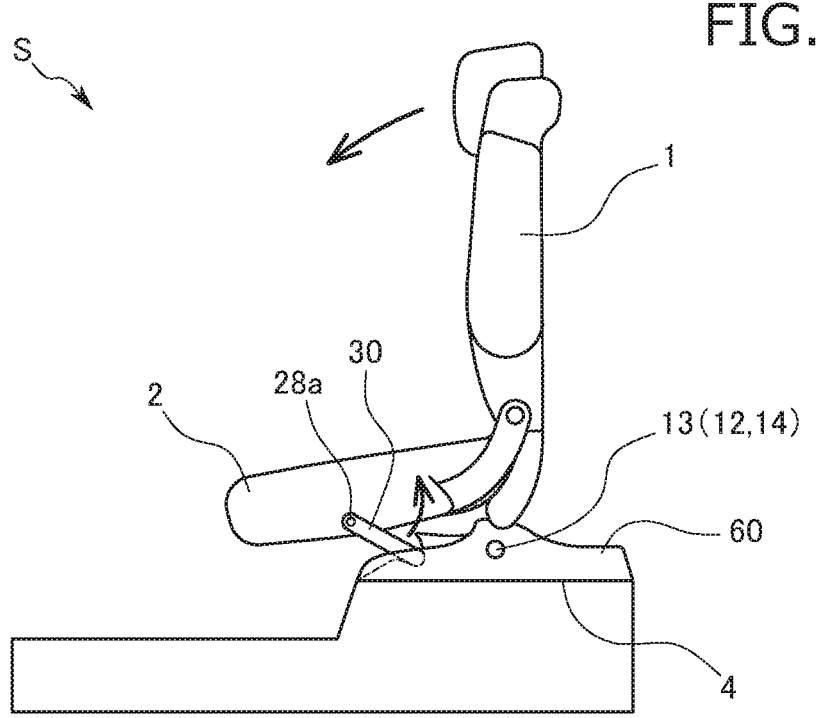

A vehicle seat S of the present embodiment is, for example, a rear seat corresponding to a backseat of a vehicle. It should be noted that it is available as a middle seat in the second row in a vehicle including three rows of seats in the vehicle front to back direction. As shown in FIG. 1, the vehicle seat S is mainly composed of a seat main body including a seat back 1, a seat cushion 2, and a headrest 3, right and left rail devices 4 mounted on a vehicle body floor and movably supporting the seat main body in the front to back direction, a support base 40 mounted on the rail devices 4, a detachable leg 30 mounted between the seat cushion 2 and the support base 40 and supporting the seat cushion 2 from below, and a leg holding member 50 mounted on the support base 40 and detachably holding a lower end of the detachable leg 30. Moreover, as shown in FIG. 1, the vehicle seat S includes a base cover 60 covering the support base 40 from above, a cushion cover 70 covering a portion of the seat cushion 2 from the right and left outer sides, and a leg guide portion guiding the detachable leg 30 detached from the leg holding member 50 in association with the movement of the seat main body. Further, as shown in FIG. 2, the vehicle seat S includes a reclining device 13 connecting the seat back 1 with respect to the support base 40 pivotally around a seat pivot shaft 12, a cushion pivoting device 25 connecting the seat cushion 2 with respect to the seat back 1 pivotally, and a leg pivoting device 28 connecting the detachable leg 30 with respect to the seat cushion 2 pivotally. As shown in FIG. 8A and FIG. 8B (referred to as "FIG. 8" herein), on the seat front side of the vehicle seat S, a concave housing floor formed at a position lower than the vehicle body floor is provided.

The vehicle seat S is a seat capable of seat arrangements of three kinds of forms: a usage state that the occupant can sit; a housed state that the seat main body is housed in the housing floor; and a tip-up state that the seat main body is flipped up. The vehicle seat S is switched from the usage state shown in FIG. 8A to the housed state shown in FIG. 9C that the seat main body falls forward and is folded and housed in the housing floor when the occupant pulls an operating lever (not shown). Moreover, the occupant raises the seat main body upward manually, thereby the vehicle seat S is switched from the housed state to the tip-up state shown in FIG. 10B. Further, when the occupant pulls the detachable leg 30 functioning as the operating lever, the seat cushion 2 rotates downwardly of the seat with respect to the seat back 1, and the vehicle seat S returns to the usage state shown in FIG. 11B from the tip-up state. The details are described below.

As shown in FIG. 1, the seat back 1 is a backrest portion supporting the back of the occupant from behind, and is configured by placing a cushion pad 1a on a back frame 10 serving as a framework shown in FIG. 2 and covering them with a skin 1b. The seat cushion 2 is a seating portion supporting the occupant from below, and is configured by placing a cushion pad 2a on a cushion frame 20 serving as a framework shown in FIG. 2 and covering them with a skin 2b from above the cushion pad 2a. The headrest 3 is a head portion supporting the head of the occupant from behind, and is configured by placing a cushion pad 3 on a pillar (not shown) serving as a core material and covering them with a skin 3b.

The rail devices 4 are arranged between the seat main body and the vehicle body floor in the up and down direction, and as shown in FIG. 2, are composed of right and left lower rails 4a fixed to the vehicle body floor and extending in the seat front to back direction, and right and left upper rails 4b slidably supported along the lower rails 4a. On the upper surfaces of the right and left upper rails 4b, the support base 40 is constructed.

The back frame 10 consists of a substantially rectangular frame-shaped body serving as a framework of the seat back 1, and as shown in FIG. 2, on the right and left outer surfaces which are in the lower portion of the back frame 10, right and left connecting brackets 11 for connecting it to the support base 40 are mounted. The connecting bracket 11 is formed of a sheet metal member extending in the up and down direction and formed into a generally arcuate shape seen from the seat side surface side, and the upper end portion of the connecting bracket 11 is mounted to the back frame 10 and the lower end portion thereof is mounted to the support base 40.

The upper end portions of the connecting brackets 11 are sandwiched between the back frame 10 and the cushion frame 20 in the seat right and left direction. On the lower end portion of the left connecting bracket 11, the seat pivot shaft 12 pivotally supported on the support base 40 in the right and left direction is provided, and on the lower end portion of the right connecting bracket 11, the reclining device 13 connecting the back frame 10 with respect to the support base 40 pivotally is mounted.

The reclining device 13 comprises a known device, and as shown in FIG. 2, is arranged on the right and left inner surfaces of the connecting bracket 11 and suppresses interference with the cushion frame 20 in the right and left direction. The reclining device 13 is mainly composed of the seat pivot shaft 12, and a spiral spring 14 rotating the back frame 10 around the seat pivot shaft 12 to the front side and biasing it into the housed state. The seat pivot shaft 12 is pivotally supported on the back frame 10 side and the support base 40 side in the right and left direction, and the spiral spring 14 is latched on the back frame 10 side at one end portion thereof and is latched on the support base 40 side at the other end portion thereof. The reclining device 13 is capable of switching to a lock state where the pivot motion of the back frame 10 is locked, the back frame 10 is locked to a rising state, the lock state is released by operating the operating lever (not shown), and the back frame 10 can be rotated to the front side by a biasing force of the spiral spring 14 and be folded to the support base 40 side.

The cushion frame 20 includes a substantially rectangular frame-shaped body serving as a framework of the seat cushion 2, and as shown in FIG. 2, is mainly composed of right and left side frames 21 arranged on the right and left sides, a front connecting pipe 22 connecting front portions of the respective side frames 21, a central connecting pipe 23 connecting substantially central portions in the front to back direction of the respective side frames, and a pan frame 24 as a plate-shaped frame connecting the front connecting pipe 22 and the central connecting pipe 23. It should be noted that the central connecting pipe 23 corresponds to a connecting frame.

The side frame 21 is formed of a sheet metal member extending in the seat front to back direction, the front portion thereof is connected to the front connecting pipe 22, and to the rear portion thereof, a cushion pivoting device 25 connecting the cushion frame 20 with respect to the back frame 10 pivotally is mounted.

Figure 9A:
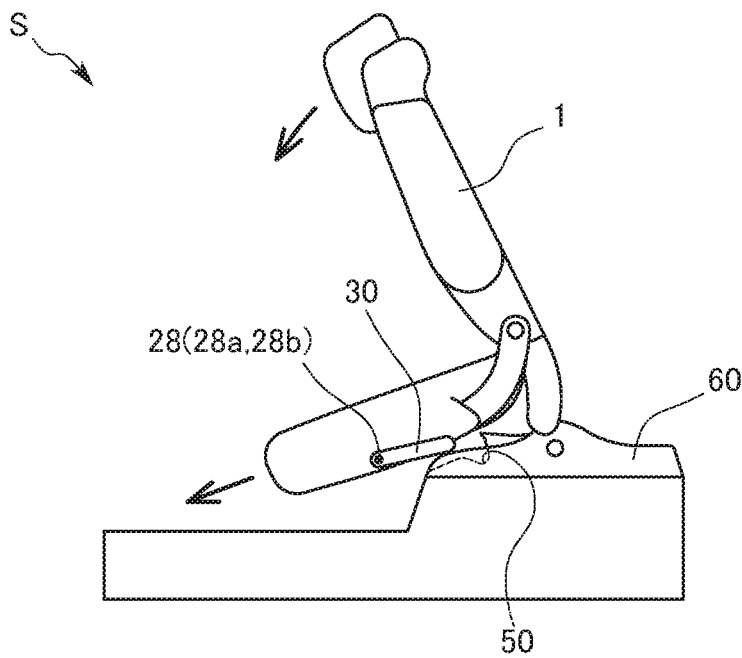
FIG. 9A, FIG. 9B, and FIG. 9C are side views of the vehicle seat, and illustrate a moving action to the housed state, according to an embodiment.
Figure 9B:
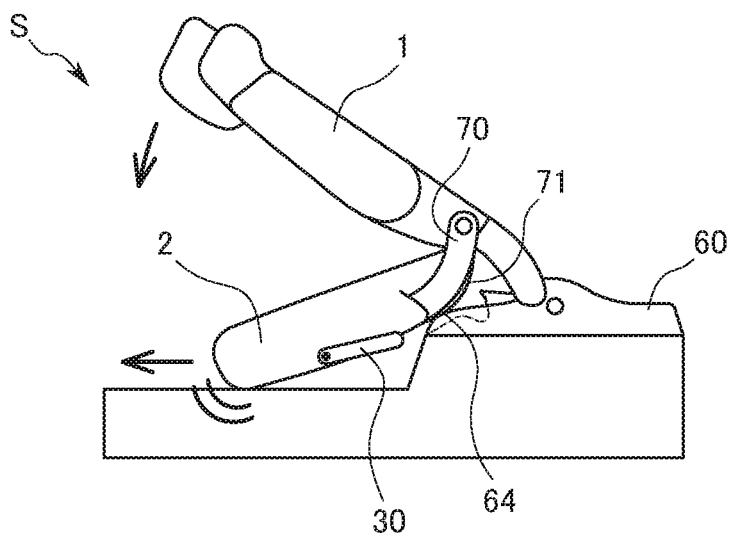
Figure 9C:
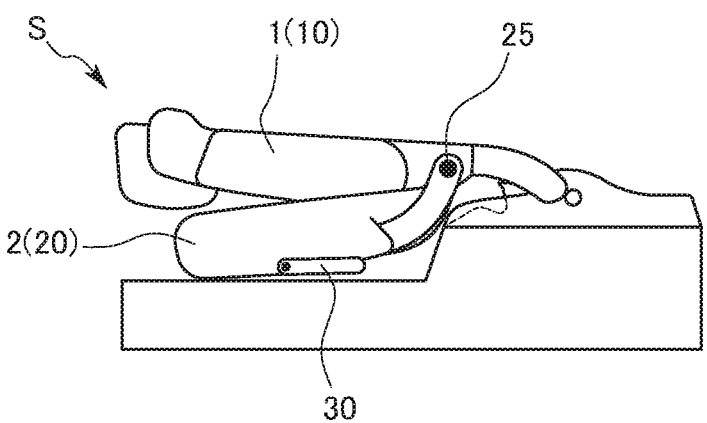
Figure 11A:
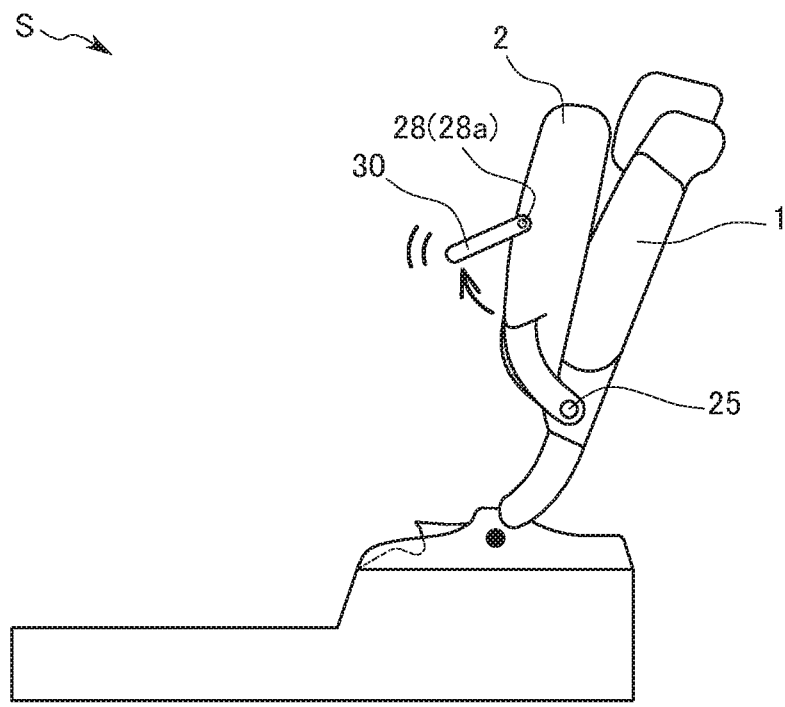
FIG. 11A and FIG. 11B are side views of the vehicle seat, illustrating a return action from the tip-up state to the usage state, according to an embodiment.

The cushion pivoting device 25 comprises a known device, and as shown in FIG. 2, includes a cushion pivot shaft 26, and a spiral spring 27 biasing the cushion frame 20 to the lower side around the cushion pivot shaft 26. The cushion pivot shaft 26 is pivotally supported on the back frame 10 side and the cushion frame 20 side in the right and left direction, and the spiral spring 27 is latched on the back frame 10 side at one end portion thereof and is latched on the cushion frame 20 side at the other end portion thereof. The cushion pivoting device 25 is capable of switching to a lock state where the pivot motion of the cushion frame 20 is locked. As shown in FIG. 9C, when the seat main body is housed in the housing floor, in other words, when the back frame 10 is in a state of being folded to the cushion frame 20 side, the cushion pivoting device 25 locks the pivot motion of the cushion frame 20. Then, as shown in FIG. 11A, the lock state is released when the detachable leg 30 functioning as an operating lever is pulled, and the cushion frame 20 can be rotated to the lower side with respect to the back frame 10 by a biasing force of the spiral spring 27.

As shown in FIG. 2, the front connecting pipe 22 is formed of a substantially channel-shaped pipe member, and on the right and left inner surfaces, a leg pivoting device 28 it mounted, which pivotally connects the detachable leg 30 with respect to the cushion frame 20. The leg pivoting device 28 includes a leg pivot shaft 28a, and a spring member 28b biasing the detachable leg 30 to the opposite side to the cushion frame 20 around the leg pivot shaft 28a, in other words, to the direction away from the cushion frame 20. The leg pivot shaft 28a is pivotally supported on the front connecting pipe 22 and the upper end portion of the detachable leg 30 in the right and left direction, and the spring member 28b is latched on the cushion frame 20 side at one end portion thereof and is latched on the detachable leg 30 side at the other end portion thereof. The leg pivoting device 28 is capable of switching to a lock state that the pivot motion of the detachable leg 30 is locked, and as shown in FIG. 9A, when the detachable leg 30 is detached from the leg holding member 50 and housed in the cushion frame 20 side, locks the pivot motion of the detachable leg 30. Then, as shown in FIG. 11A, the lock state is released when the locked detachable leg 30 is pulled, and the detachable leg 30 can be moved to a position where it can be attached to the leg holding member 50 to return to the usage state by a biasing force of the spring member 28b.

As shown in FIG. 2, the detachable leg 30 is a substantially channel-shaped pipe member supporting the seat cushion 2, and includes leg main body parts 31 arranged on the right and left sides, and a leg connection portion 32 connecting the lower end portions of the respective leg main body parts 31. The upper end portions of the leg main body parts 31 are connected to the right and left inner surfaces of the cushion frame 20 which are in the substantially central portion in the front to back direction, and the substantially central portion in the right and left direction of the leg connection portion 32 is detachably held by the leg holding member 50. The upper end portion of the detachable leg 30 projects in front of the seat with respect to the lower end portion of the detachable leg 30, and the detachable leg 30 is upwardly inclined to the front from the lower end portion thereof toward the upper end portion thereof.

Figure 3:
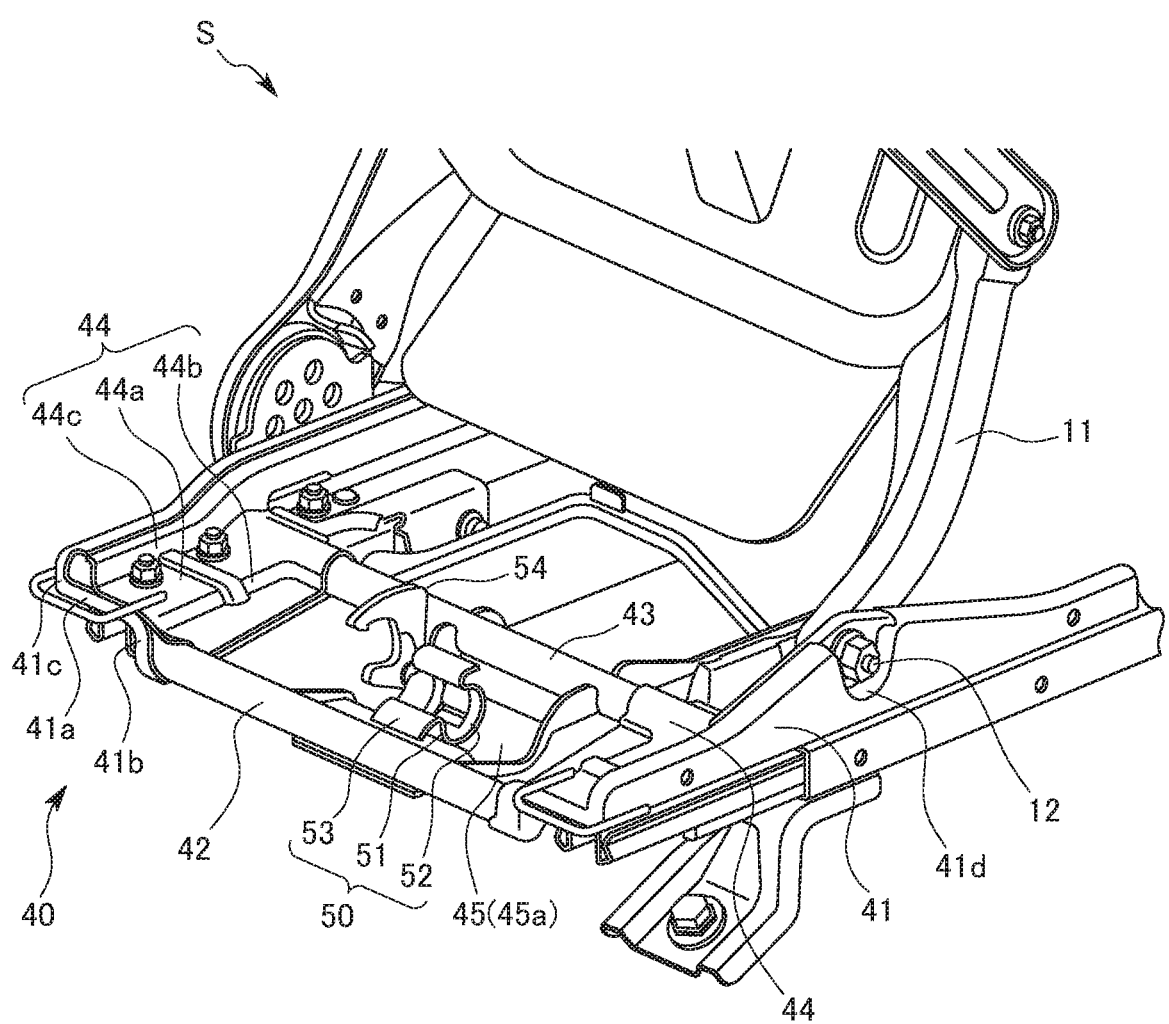
FIG. 3 is a perspective view of the seat frame, and is an enlarged partial view thereof, according to an embodiment.

The support base 40 is a member supporting the seat main body, and as shown in FIG. 3, includes right and left side base parts 41 arranged on the right and left sides along the upper rails 4b, a first base connection portion 42 connecting the front portions of the respective side base parts 41, a second base connection portion 43 connecting the substantially central portions of the respective side base parts 41, right and left reinforcing base parts 44 mounted on the upper surfaces of the respective side base parts 41, and a holding member support portion 45 connecting the first base connection portion 42 and the second base connection portion 43 and supporting the leg holding member 50.

The side base portion 41 is formed of a substantially eccentric-shaped sheet metal member elongated in the front to back direction, and as shown in FIG. 3, is composed of a connecting wall portion 41a connected to the upper surfaces of the upper rails 4b, an inner wall portion 41b bent downwardly from the right and left inner end portions of the connecting wall portion 41a, and an outer wall portion 41c bent upwardly from the right and left outer end portions of the connecting wall portion 41a. Moreover, of the left side base portion 41, in a portion facing the seat pivot shaft 12 seen from the seat side surface side, a substantially semicircular notch portion 41d is formed, thereby facilitating assembly of the seat pivot shaft 12 from the seat side surface side.

As shown in FIG. 3, the first base connection portion 42 and the second base connection portion 43 are formed of a substantially semicircular pipe member extending in the right and left direction, are separated from each other with a predetermined distance in the front to back direction. As shown in FIG. 3, the reinforcing base portion 44 is formed of a substantially eccentric-shaped sheet metal member elongated in the front to back direction, and is composed of a connecting wall portion 44a connected to the upper surfaces of the side base parts 41, an inner wall portion 44b bent downwardly from the right and left inner end portions of the connecting wall portion 44a, and an outer wall portion 44c bent upwardly from the right and left outer end portions of the connecting wall portion 44a. As shown in FIG. 3, the respective right and left end portions of the first base connection portion 42 and the second base connection portion 43 are connected to the side base parts 41 and the reinforcing base parts 44 to be sandwiched therebetween. The reinforcing base parts 44 overlap with the side base parts 41 up and down to form a closed section structure, and the support base 40 is formed into a hollow shape.

As shown in FIG. 3, the holding member support portion 45 is a curved sheet metal member supporting the leg holding member 50 and extends in the seat front to back direction, and in the substantially central portion thereof, a folded portion 45a folded downwardly relative to the front portion and the rear portion is formed. The front portion of the holding member support portion 45 is mounted to the first base connection portion 42, and the rear portion of the holding member support portion 45 is mounted to the second base connection portion 43. On the upper surface of the folded portion 45a, the leg holding member 50 is mounted.

The leg holding member 50 is formed of a substantially U-shaped clip member detachably holding the detachable leg 30, and as shown in FIG. 3, is composed of a pair of side wall parts 51, and a bottom wall portion 52 connecting the lower end portions of the respective side wall parts 51. Each side wall portion 51 is folded from the lower end portion toward the upper end portion in an adjacent direction to each other, in other words, is folded in the opening portion inside direction to narrow the opening portion of the leg holding member 50, and on the upper end portion thereof, a curl portion 53 warped in the opening portion outside direction is formed. The bottom wall portion 52 is formed into a curved shape, and is mounted to the folded portion 45a of the holding member support portion 45 along it. Specifically, the bottom wall portion 52 includes a cut and raised portion (not shown) formed by cutting and raising a portion thereof, and the cut and raised portion is fixed to the folded portion 45a by hooking it in a hooking groove (not shown) formed therein.

The leg holding member 50 is supported by the holding member support portion 45 at a position forwardly inclined at a predetermined angle of inclination with respect to a horizontal plane. In other words, the leg holding member 50 is supported by the holding member support portion 45 at a position where the opening portion thereof is directed forward obliquely upward. In a portion adjacent to the leg holding member 50, an inertial locking device 54 is arranged, which locks the leg connection portion 32 on the lower end portion of the detachable leg 30 in a state of being held by the leg holding member 50 at the time of rear end collision of a vehicle. The inertial locking device 54 comprises a known device, is mounted to the support base 40 as shown in FIG. 3, is arranged between the first base connection portion 42 and the second base connection portion 43 in the front to back direction, and is arranged at a position overlapping with the leg holding member 50 in the front to back direction.

Figure 4:
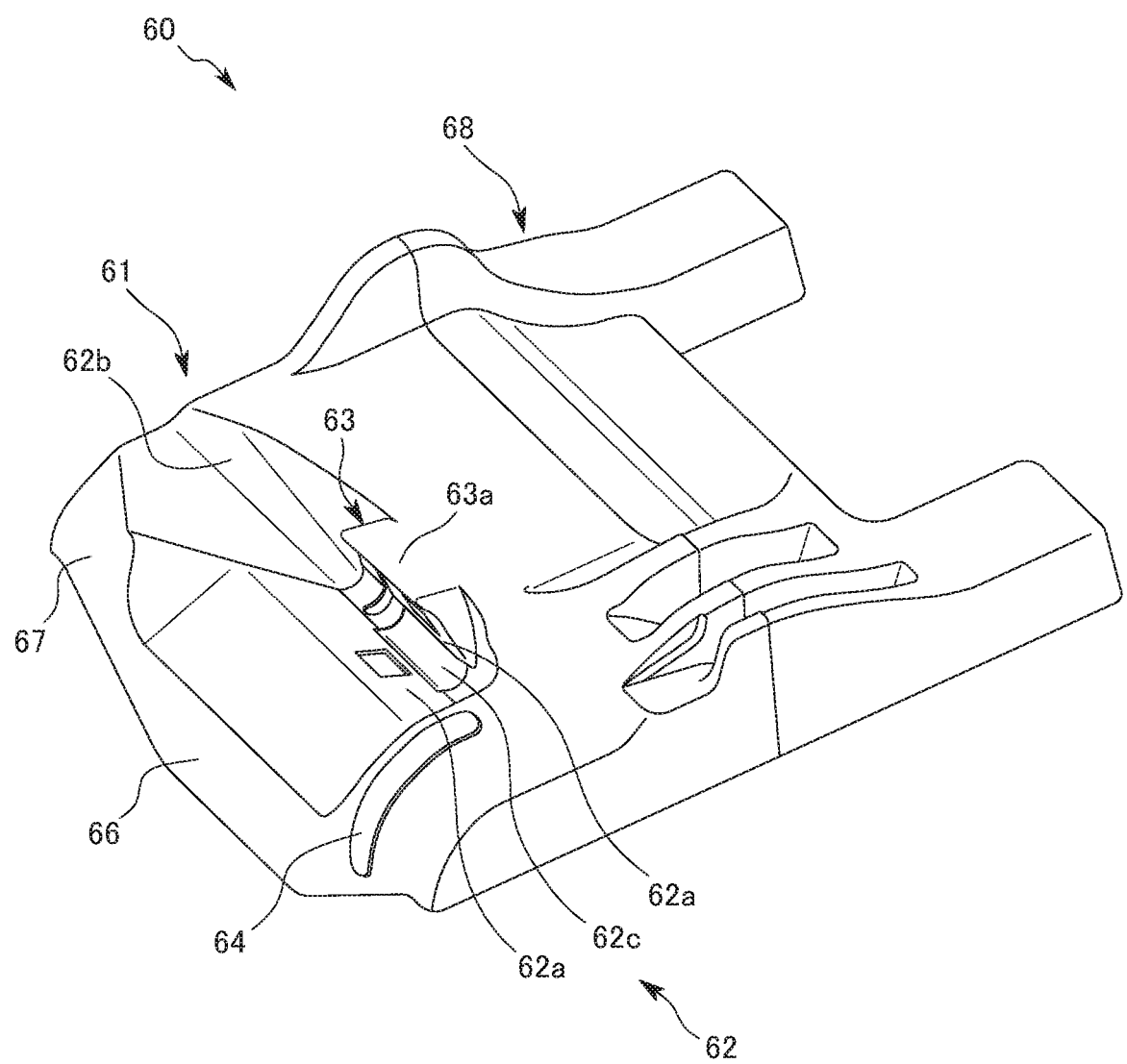
FIG. 4 is a perspective view of a base cover that protects a support base of the vehicle seat, according to an embodiment.
Figure 5:
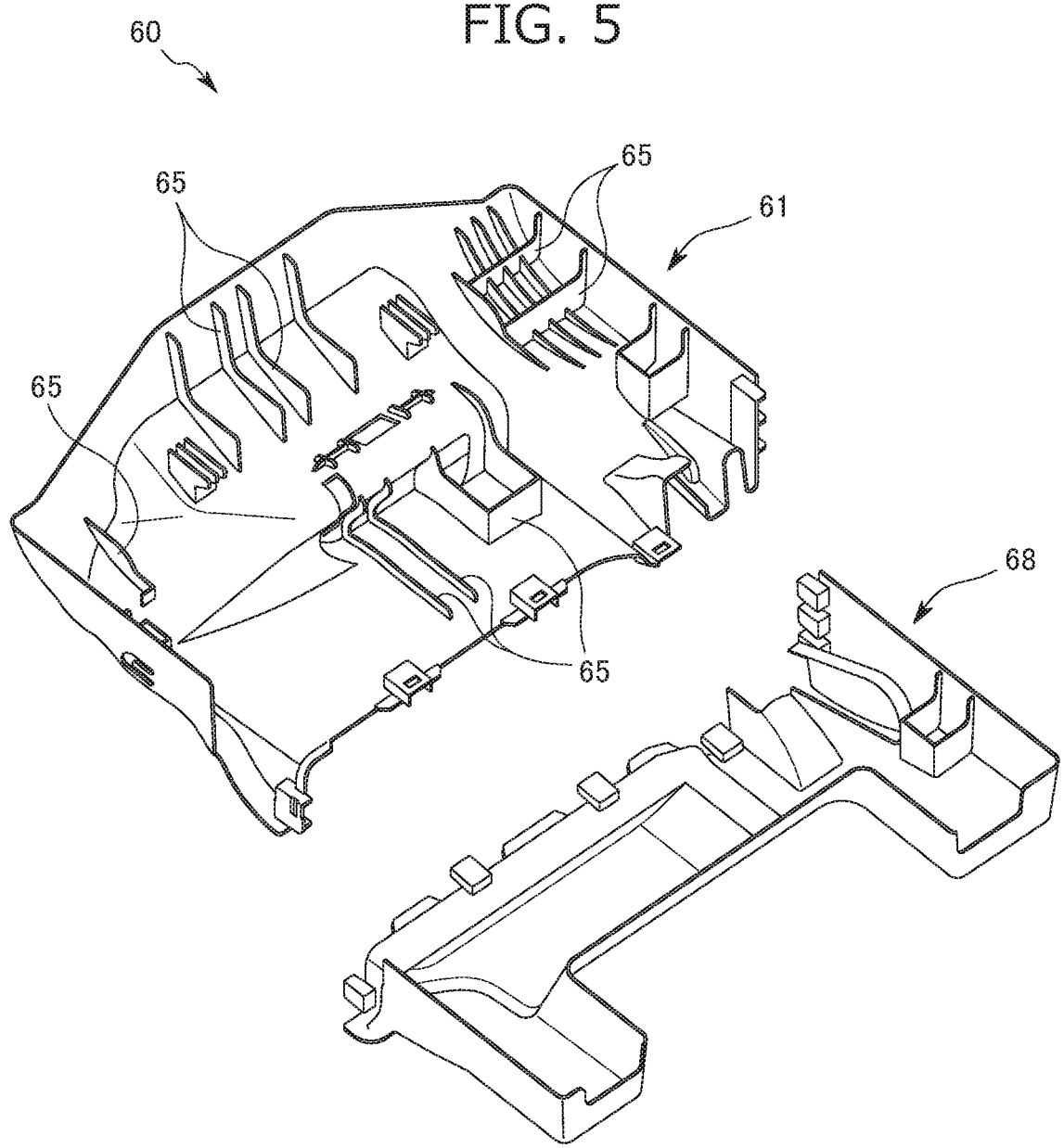
FIG. 5 is an exploded perspective view of the base cover, according to an embodiment.

The base cover 60 is formed of a resin molded article covering the entire support base 40 from above, and as shown in FIG. 4 or FIG. 5, is composed of a front cover portion 61 arranged in the seat front side, and a rear cover portion 68 arranged at the rear of the front cover portion 61. The front cover portion 61 and the rear cover portion 68 are snap-fit coupled. As shown in FIG. 4, the front cover portion 61 mainly includes a leg accommodating concave portion 62 accommodating the detachable leg 30, a leg movement restricting portion 63 restricting the detachable leg 30 from moving behind than the leg accommodating concave portion 62, and a base abutting portion 64 provided in front of the seat with respect to the leg accommodating concave portion 62 and capable of abutting a portion of the seat cushion 2.

The leg accommodating concave portion 62 includes a substantially U-shaped concave portion recessed toward the lower side from the substantially central portion of the upper surface of the base cover 60, and is formed as an elongated body extending in the right and left direction. The leg accommodating concave portion 62 is composed of a pair of front and rear side wall parts 62a, a pair of right and left side wall parts 62b, and a bottom wall portion 62c connecting the lower end portions of the respective side wall parts 62a, 62b, and is arranged at a position where the opening portion thereof is directed forward obliquely upward. Of the leg accommodating concave portion 62, in the central portions in the right and left direction of the respective front and rear side wall parts 62a, substantially quadrangular through holes are formed respectively, and as shown in FIG. 1, a pair of the side wall parts 51 and the curl portion 53 which constitute the leg holding member 50 are exposed to the outside via the through holes from the back surface side of the base cover 60. Moreover, of the leg accommodating concave portion 62, in the rear side wall portion 62a and the bottom wall portion 62c, through holes elongated in the up and down direction are successively formed, and a portion of the inertial locking device 54 exposes to the outside via the through holes from the back surface side of the base cover 60.

As shown in FIG. 4, the leg movement restricting portion 63 includes a portion projecting toward the seat front side from the substantially central portion of the upper surface of the base cover 60, is formed in succession in the seat rear side from the leg accommodating concave portion 62, and is provided as an elongated body extending in the seat right and left direction. The leg movement restricting portion 63 is formed to be wide in the front to back direction toward the upper end side thereof from the lower end side, and on the upper end of the leg movement restricting portion 63, a protruding portion 63a protruding upwardly from the upper surface of the base cover 60 is formed. The protruding portion 63a further projects in front of the seat. According to the above configuration, when the detachable leg 30 is accommodated in the leg accommodating concave portion 62, the leg movement restricting portion 63 restricts the rearward movement of the detachable leg 30 and can guide the detachable leg 30 to the leg accommodating concave portion 62 side.

The base abutting portion 64 consists of a convex portion slightly protruding toward the upper side from the front portion of the upper surface of the base cover 60, is an elongated body extending in the seat front to back direction, and is formed as a relatively narrow shape in the seat right and left direction. Moreover, the base abutting portion 64 is arranged in one end portion in the right and left direction of the upper surface of the base cover 60, and is formed to slightly project toward the front of the seat. When the seat main body moves between the housed state and the usage state, the base abutting portion 64 is arranged at a position where the seat main body is capable of abutting a cushion abutting portion 71 (described below) provided to the cushion cover 70, and has a substantially convex shaped curved surface projecting to the cushion cover 70 side.

In the base cover 60, on each back surface on the support base 40 side of the leg accommodating concave portion 62, the leg movement restricting portion 63, and the base abutting portion 64, a reinforcing rib 65 having a predetermined shape is formed as shown in FIG. 5. Therefore, of the base cover 60, particularly, a portion requiring support rigidity for contacting other component parts has a shape with increased support rigidity.

Figure 6A:
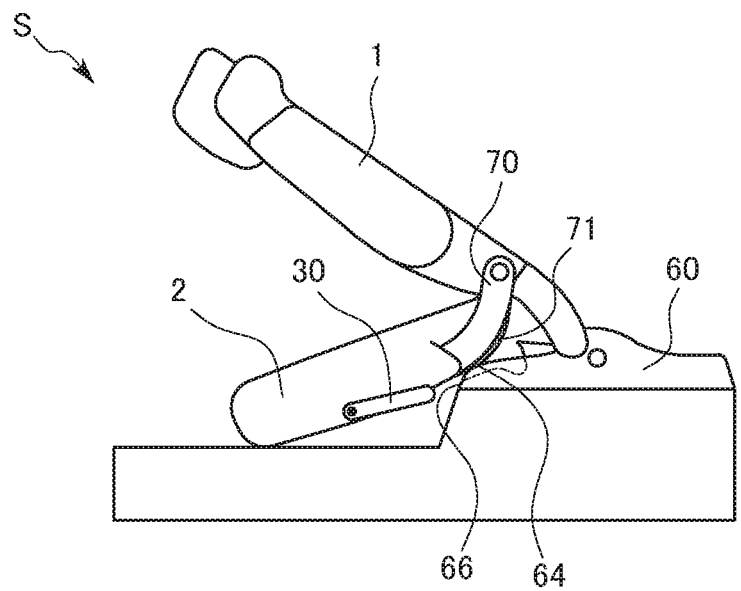
FIG. 6A and FIG. 6B are a side view and a partial side view of the vehicle seat, respectively, illustrating a state that a cushion abutting portion of the vehicle seat abuts a base abutting portion, according to an embodiment.
Figure 6B:
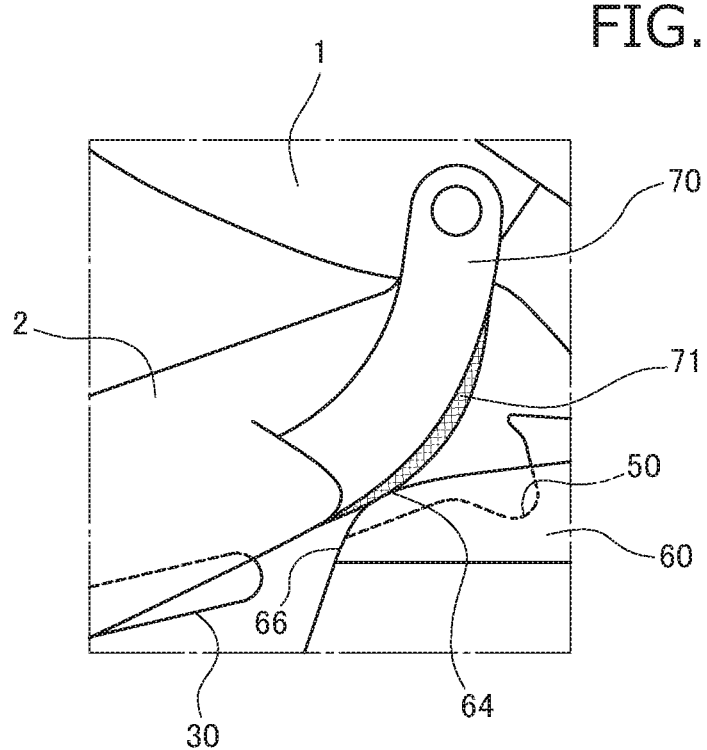

As shown in FIG. 1, of the seat cushion 2, the cushion cover 70 is formed of a substantially U-shaped resin molded article covering the right and left side frames 21 shown in FIG. 2 from the right and left outer sides, and is arranged at the rear of the seat with respect to the detachable leg 30. As shown in FIG. 6A and FIG. 6B (referred to as "FIG. 6" herein), on the bottom surface of the cushion cover 70, the cushion abutting portion 71 projecting to the base cover 60 side is integrally formed.

The cushion abutting portion 71 has a substantially convex shaped curved surface projecting to the base cover 60 side, and is arranged at a position overlapping with the base abutting portion 64 in the seat right and left direction.

Moreover, the cushion abutting portion 71 is arranged at a position corresponding to the portion to which the central connecting pipe 23 is connected, of the side frame 21 shown in FIG. 2. When the seat main body moves between the housed state and the usage state, the seat cushion 2 becomes in a state of running upon the base cover 60 if the cushion abutting portion 71 abuts the base abutting portion 64 as shown in FIG. 6.

Leg Guide Portion

Figure 7A:
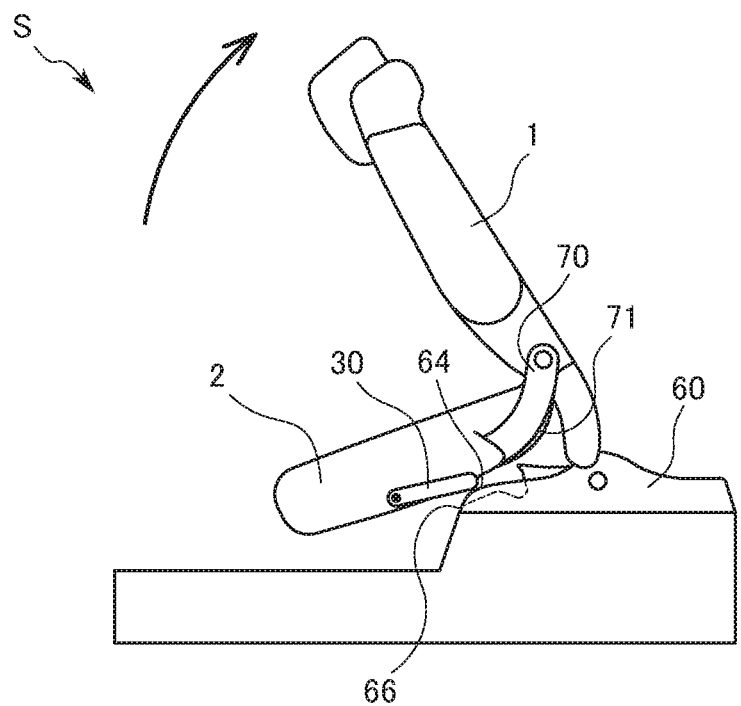
FIG. 7A and FIG. 7B are a side view and a partial side view of the vehicle seat, respectively, illustrating a state that a detachable leg of the vehicle seat passes above a leg movement inhibiting portion, according to an embodiment.
Figure 7B:
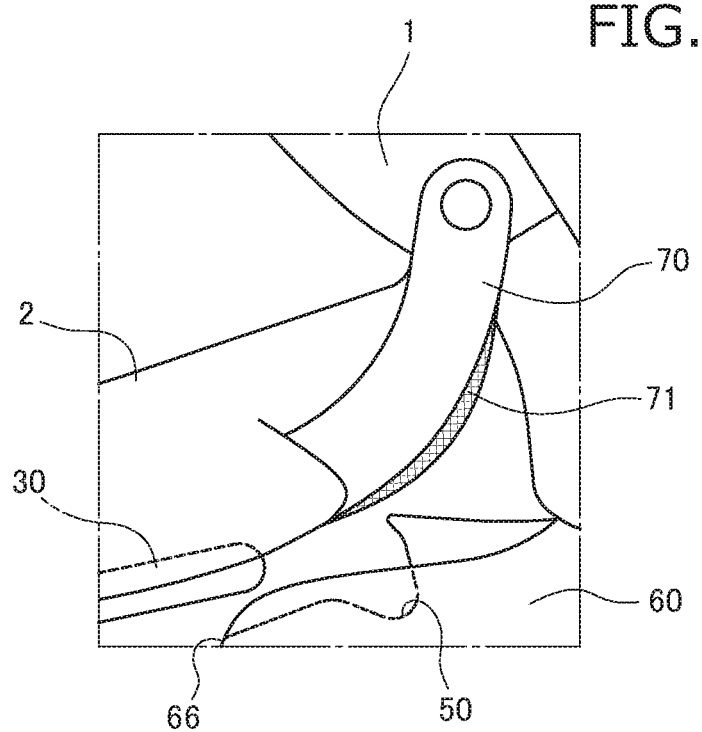

When the seat main body moves between the housed state and the usage state, the leg guide portion guides the detachable leg 30 moving together with the seat main body to avoid contact with the leg movement inhibiting portion which is a portion of the vehicle seat S. When moving the seat main body from the housed state side shown in FIG. 6 to the usage state side shown in FIG. 7A and FIG. 7B, the leg guide portion of the present embodiment causes the cushion abutting portion 71 arranged at the rear of the seat with respect to the detachable leg 30 in the seat cushion 2 to abut the base abutting portion 64 arranged in the seat front end portion of the base cover 60 in advance as shown in FIG. 6, thereby guiding the detachable leg 30 to pass above the leg movement inhibiting portion 66 provided in the front surface of the base cover 60.

For example, in the middle of moving the seat main body from the usage state to the housed state, a moving operation of trying to return it to the usage state again may be performed. Conventionally, if the occupant tries to return the seat main body relatively quickly at the time of such a moving operation, the detachable leg 30 could fail to be reattached to the leg holding member 50. Specifically, in the middle of moving the seat main body from the housed state side shown in FIG. 6 to the usage state side shown in FIG. 7A and FIG. 7B, the detachable leg 30 contacts the leg movement inhibiting portion 66, the detachable leg 30 flips up together with the seat cushion 2, and the detachable leg 30 runs upon the leg holding member 50, thus it could fail to be reattached. However, in the middle of moving the seat main body from the housed state side shown in FIG. 6 to the usage state side shown in FIG. 7A and FIG. 7B, the present embodiment is configured such that the cushion abutting portion 71 abuts the base abutting portion 64. Therefore, by causing the cushion abutting pat 71 to abut the base abutting portion 64 in advance, the seat cushion 2 becomes in a state of running upon the base cover 60 and the movement path of the detachable leg 30 is stabilized, and the detachable leg 30 is guided to pass above the leg movement inhibiting portion 66, and can be reattached to the leg holding member 50 without contacting the leg movement inhibiting portion 66.

Seat Housing Action

Next, the action of moving the seat main body from the usage state to the housed state is described with reference to FIG. 8 (i.e., FIG. 8A and FIG. 8B) and FIG. 9 (i.e., FIGS. 9A, 9B, and 9C). It should be noted that FIG. 8 and FIG. 9 show the reclining device 13, the cushion pivoting device 25, and the leg pivoting device 26 in a lock state by a black circle and show the same in an unlock state by a white circle. The same applies to FIG. 10 (FIG. 10A and FIG. 10B), FIG. 11 (FIG. 11A and FIG. 11B), FIG. 12 (FIG. 12A and FIG. 12B), and FIG. 13.

When the vehicle seat S is in the usage state shown in FIG. 8A, the seat back 1 is supported by the support base 40 and locked to a rising state by the reclining device 13, and the seat cushion 2 connected to the seat back 1 is supported by the detachable leg 30 held by the leg holding member 50 from below.

When moving the vehicle seat S from the usage state to the housed state, an operating lever (not shown) provided on the upper surface of the seat back 1 is operated, for example. As shown in FIG. 8B, upon operating the operating lever by an occupant, the lock state of the reclining device 13 is released, and the seat back 1 begins rotation to the seat front side around the seat pivot shaft 12 to move the seat cushion 2 to the housing floor by a biasing force of the spiral spring 14. The detachable leg 30 begins rotation to the seat cushion 2 side around the leg pivot shaft 28a with respect to the seat cushion 2 in conjunction with the rotation of the seat back 1. At this time, the detachable leg 30 becomes in a stretched state between the seat cushion 2 and the vehicle body floor side, thereby capable of stably moving the seat cushion 2 and the seat back 1. It should be noted that a known cable (not shown) is connected between the operating lever and the reclining device 13, and that it has a mechanism in which the cable is pulled by operation of the operating lever to release the lock state.

As shown in FIG. 9A, when the seat back 1 reaches to a predetermined rotational position, the detachable leg 30 is detached from the leg holding member 50. In other words, the detachable leg 30 is detached from the leg holding member 50 when it reaches to a predetermined rotational position in conjunction with the rotation of the seat back 1. The detached detachable leg 30 rotates to be folded to the seat cushion 2 side around the leg pivot shaft 28a against a biasing force of the spring member 28b, by running upon the upper surface of the base cover 60. Then, the detachable leg 30 is locked in a state of being housed in the seat cushion 2 side by the leg pivoting device 28 when reaching to a predetermined rotational position.

Further, as shown in FIG. 9B, when the seat back 1 reaches to a predetermined rotational position, the cushion abutting portion 71 abuts the base abutting portion 64. Then, the front portion of the seat cushion 2 abuts the housing floor surface earlier than the detachable leg 30. It should be noted that to the front portion of the seat cushion 2, a sliding member (not shown) is mounted, which is slidable with respect to the housing floor surface, and that the seat cushion 2 can stably slide on the housing floor surface toward the seat front side.

As shown in FIG. 9C, by a series of actions described above, the seat main body is housed in the housing floor, and the vehicle seat S is switched to the housed state. The seat cushion 2 is locked by the cushion pivoting device 25, in the housed state, concretely, in a state that the seat back 1 is folded to the seat cushion 2 side. The detachable leg 30 is arranged at a position lower than the leg holding member 50 in the housed state.

Seat Tip-Up Action

Figure 10A:
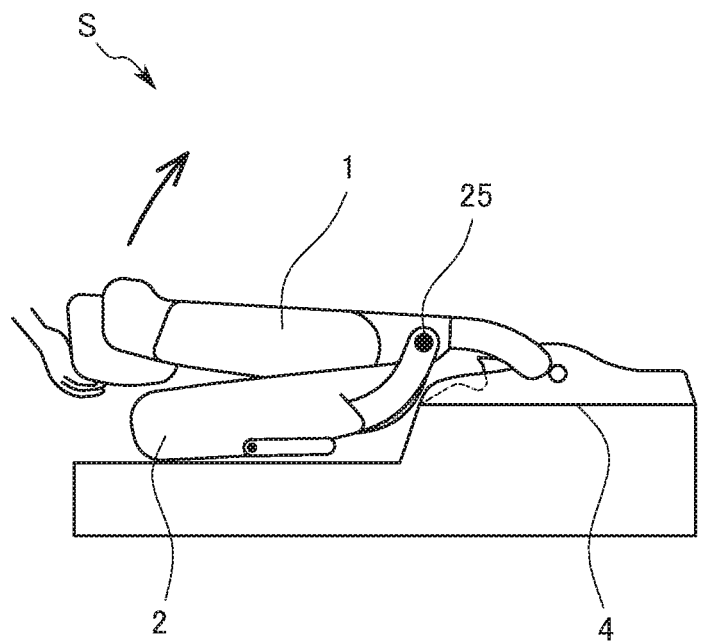
FIG. 10A and FIG. 10B are side views of the vehicle seat, illustrating a moving action from the housed state to a tip-up state, according to an embodiment.

Next, the action of moving the seat main body from the housed state to the tip-up state is described with reference to FIG. 10. When the vehicle seat S is in the housed state shown in FIG. 10A, for example, the occupant raises the seat main body upward manually, thereby the vehicle seat S is switched to the tip-up state shown in FIG. 10B. At this time, the cushion pivoting device 25 locks the pivot motion of the seat cushion 2, so it is possible to raise the seat cushion 2 upward integrally by raising the seat back 1 upward. It should be noted that in the tip-up state, it is possible to secure a further wide luggage room space in the seat front side by sliding the upper rails 4b to the seat rear side with respect to the lower rails 4a.

Figure 10B:
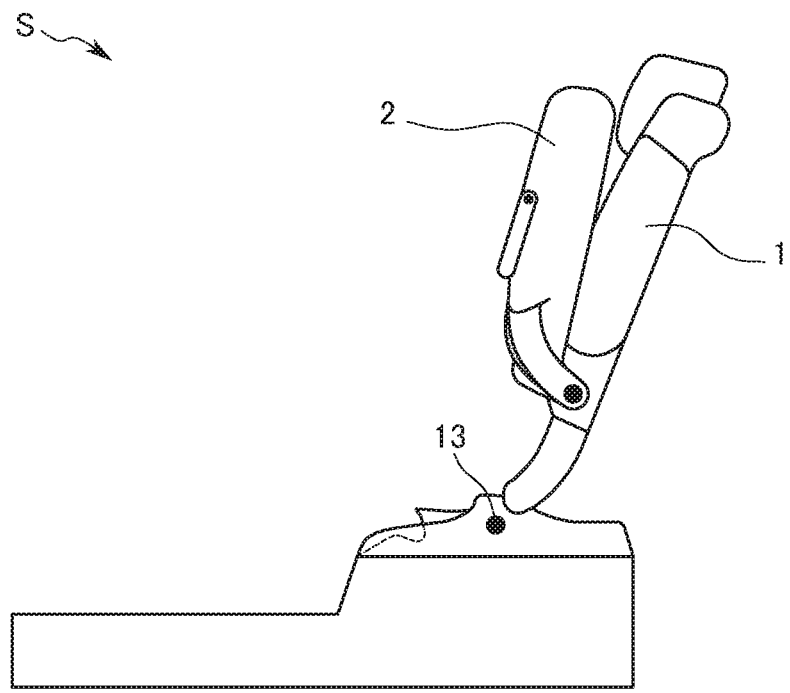

When the vehicle seat S switches to the tip-up state shown in FIG. 10B, the seat back 1 returns to the same position as the position in the usage state, and is locked in the rising state by the reclining device 13.

Seat Return Action

Next, the action of moving the seat main body from the tip-up state to the usage state is described with reference to FIG. 11. As shown in FIG. 11A, when moving the vehicle seat S from the tip-up state to the usage state, for example, the detachable leg 30 functioning as an operating lever is operated. An occupant pulls the detachable leg 30 to be rotated upwardly around the leg pivot shaft 28a, in other words, pulls it in the direction away from the seat cushion 2 side, thereby releasing the lock state of the cushion pivoting device 25 and the leg pivoting device 28. It should be noted that a known cable (not shown) is connected between the detachable leg 30 and the cushion pivoting device 25 and, that the cable is configured to be pulled by operation of the detachable leg 30 to release the lock state.

Figure 11B:
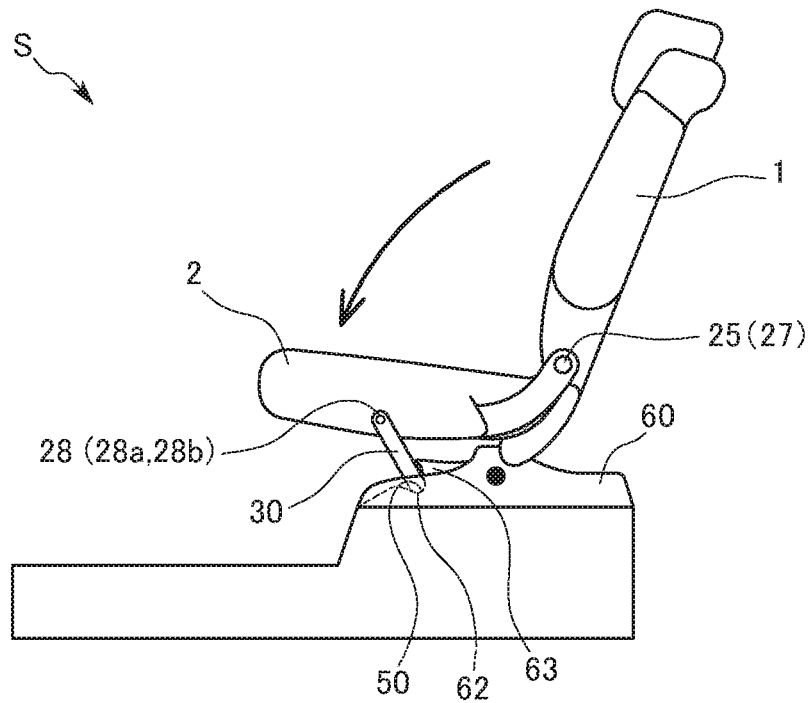

As shown in FIG. 11B, the seat cushion 2 is rotated to the lower side with respect to the seat back 1 by a biasing force of the spiral spring 27 in association with release of the cushion pivoting device 25. The detachable leg 30 is rotated around the leg pivot shaft 28a to a position where the detachable leg 30 is attachable to the leg holding member 50 by a biasing force of the spring member 28b in association with release of the leg pivoting device 28, thereby being attached to the leg holding member 50. At this time, the detachable leg 30 moves toward the leg holding member 50 mounted to the lower end side of the leg accommodating concave portion 62 by being guided by the leg accommodating concave portion 62 and the leg movement restricting portion 63 of the base cover 60. By a series of actions described above, the vehicle seat S returns to the usage state shown in FIG. 11B.

Second Embodiment of Vehicle Seat

Figure 12A:
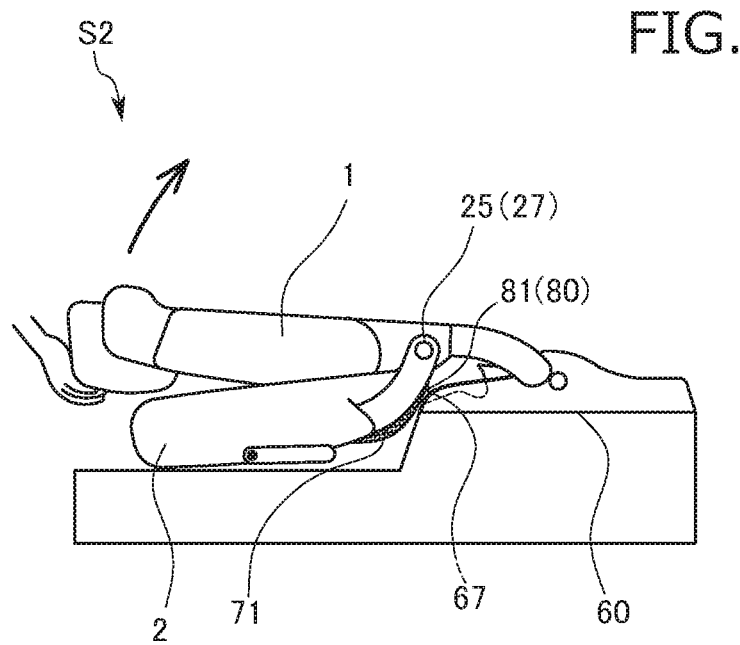
FIG. 12A and FIG. 12B are side views of a vehicle seat according to a second embodiment, illustrating a direct return action from a housed state to a usage state.

Next, a second embodiment of a vehicle seat is described with reference to FIG. 12 (i.e., FIGS. 12A and 12B), FIG. 13, and FIG. 14 (i.e., FIGS. 14A and 14B). It should be noted that in the following description, the description of the contents overlapping with the aforementioned vehicle seat S is omitted. A vehicle seat S2 according to the second example is differently configured by including a lock-off device 80 capable of switching the cushion pivoting device 25 from a lock state to an unlock state. Then, the vehicle seat S2 is a vehicle seat of one motion type capable of directly switching the seat main body from a housed state to a usage state, compared to the aforementioned vehicle seat S.

The lock-off device 80 comprises a known device, is mounted to the seat rear end portion of the seat cushion 2, and is arranged at a position overlapping with the cushion abutting portion 71 in the seat front to back direction. Specifically, in the seat cushion 2, the lock-off device 80 is provided on the right side frame 21, and the cushion abutting portion 71 is provided on the left side frame 21. The lock-off device 80 protrudes to partly project at the rear of the seat from the seat rear end of the seat cushion 2, and includes a lock-off lever 81 for switching the cushion pivoting device 25.

The lock-off lever 81 is mounted to a position where it is capable of abutting the lever abutting portion 67 located at the seat front surface portion of the base cover 60. When moving the seat main body from the usage state to the housed state shown in FIG. 12A, the lock-off lever 81 moving together with the seat cushion 2 abuts the lever abutting portion 67 of the base cover 60 and is further pressed to the seat front side to rotate around a lock-off lever rotating shaft (not shown), and thereby capable of switching the cushion pivoting device 25 from the lock state to the unlock state.

Next, the action of directly returning the seat main body from the housed state to the usage state is described with reference to FIG. 12 to FIG. 14. First, when the vehicle seat S2 is in the housed state shown in FIG. 12A, the lock-off lever 81 abuts the lever abutting portion 67 of the base cover 60, and is further in a state of being pressed to the seat front side by the lever abutting portion 67. As a result, the lock-off device 80 releases the lock state of the cushion pivoting device 25. When the occupant raises the seat main body upward manually, the seat cushion 2 is rotated to the lower side with respect to the seat back 1 by its own weight and a biasing force of the spiral spring 27 because the lock state of the cushion pivoting device 25 is already released.

Figure 12B:
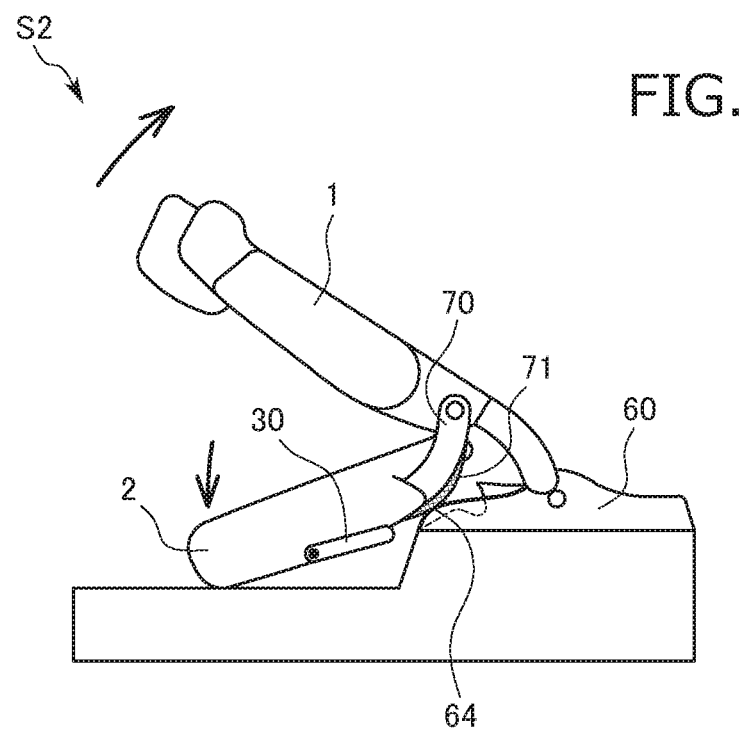
Figure 13:
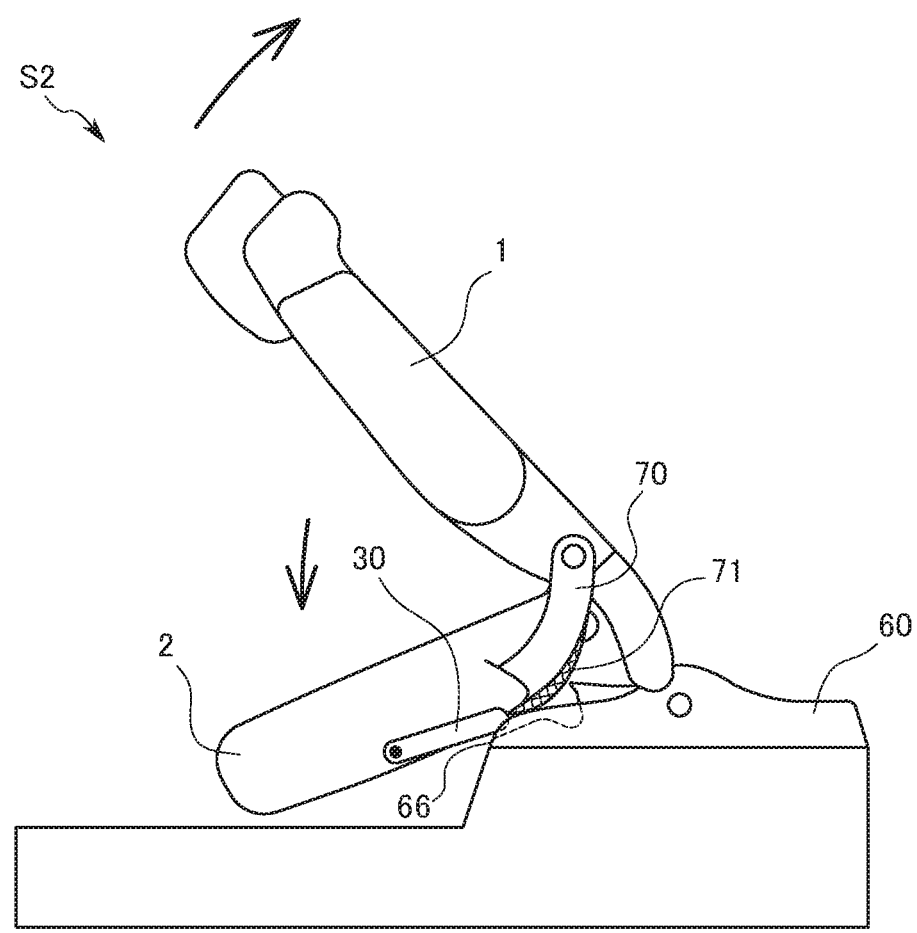
FIG. 13 is a side view of the vehicle seat according to the second embodiment, and is a view illustrating a direct return action to the usage state.

When the vehicle seat S2 reaches to a predetermined position shown in FIG. 12B, the cushion abutting portion 71 abuts the base abutting portion 64. By causing the cushion abutting portion 71 to abut the base abutting portion 64 in advance, as shown in FIG. 13, the detachable leg 30 is guided to pass above the leg movement inhibiting portion 66. Specifically, until the detachable leg 30 pass above at least the leg movement inhibiting portion 66, the cushion abutting portion 71 abuts the base abutting portion 64. By such a configuration, the detachable leg 30 can be successfully guided.

Figure 14A:
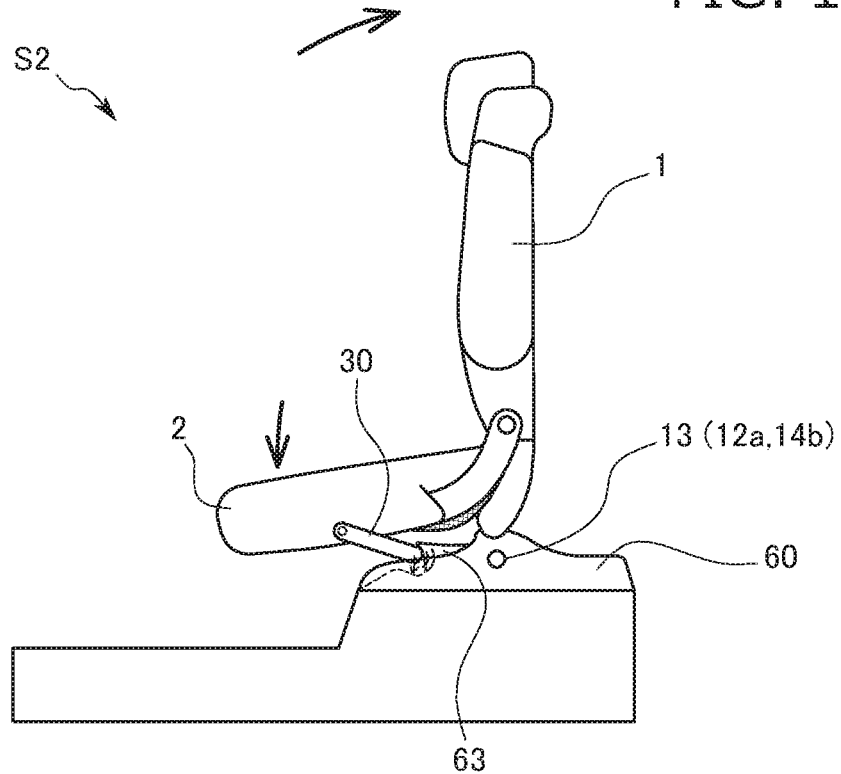
FIG. 14A and FIG. 14B are side views of the vehicle seat according to the second embodiment, illustrating a direct return action to the usage state.
Figure 14B:
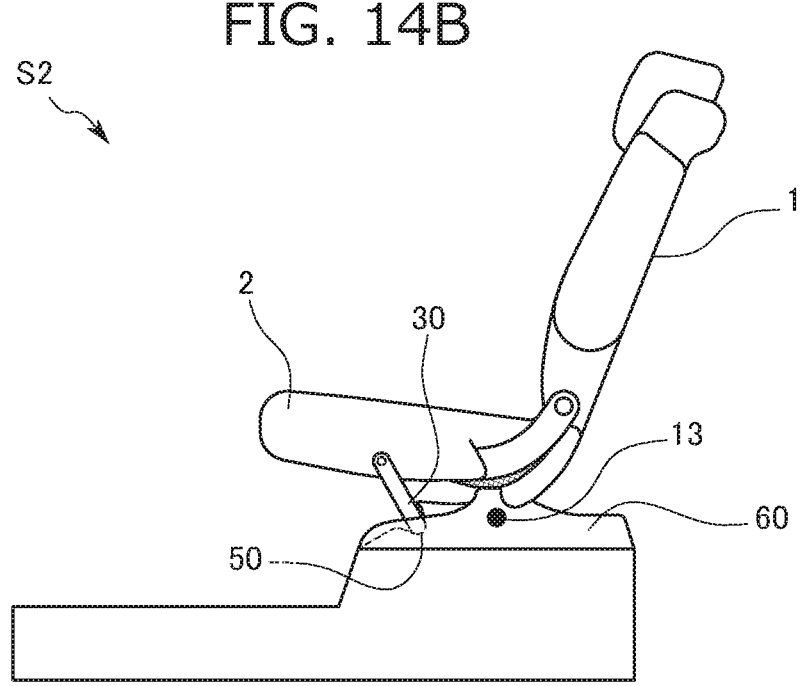

As shown in FIG. 14A, the moving detachable leg 30 abuts the leg movement restricting portion 63, and is restricted by the leg movement restricting portion 63 from moving toward the leg holding member 50 side. At this time, the detachable leg 30 abuts the leg movement restricting portion 63 and is guided to be pulled to the lower side, thereby the lock state of the leg pivoting device 28 is automatically released. Then, the detachable leg 30 is reattached to the leg holding member 50. By a series of actions described above, the vehicle seat S2 returns to the usage state shown in FIG. 14B.

According to the above configuration, when directly moving the seat main body from the housed state to the usage state, the leg guide portion can guide the detachable leg 30 moving together with the seat main body not to contact the leg movement inhibiting portion 66 which is a portion of the vehicle seat S2.

Other Embodiments

In the above embodiment, the housing floor is formed in front of the vehicle seat S, but not limited thereto, the housing floor may be formed behind the vehicle seat S. In that case, the positional relationship in the seat front to back direction between the seat pivot shaft 12 and the detachable leg 30 and the positional relationship in the front to back direction between the detachable leg 30 and the leg movement restricting portion 63 are desirable to be arranged in reverse respectively.

In the above embodiment, the movement state of the seat main body is not limited to the housed state, and may be applied to the tip-up state or the like in the present embodiment.

In the above embodiment, when moving the seat main body from the housed state side to the usage state side, the leg guide portion guides the detachable leg 30 to avoid contact with the leg movement inhibiting portion 66, but not limited thereto, it can be appropriately changed. That is to say, when switching the seat main body between the usage state and the movement state that it is moved from the usage state to a predetermined position, the leg guide portion has only to guide the detachable leg 30 to avoid contact with a portion of the vehicle seat. Then, the movement state is not limited to the housed state, and may be applied to the tip-up state or the like.

In the above embodiment, the detachable leg 30 is configured to be rotated to the seat rear side around the leg pivot shaft 28a with respect to the seat cushion 2 and accommodated in the seat cushion 2 side when switched from the usage state to the housed state, but not limited thereto, the detachable leg 30 may be configured to be rotated to the seat front side around the leg pivot shaft 28a and accommodated in the seat cushion 2 side. At this time, the upper end portion of the detachable leg 30 is arranged at the rear of the seat with respect to the lower end portion of the detachable leg 30, and the detachable leg 30 is desirable to be upwardly inclined to the rear from the lower end portion thereof toward the upper end portion thereof, thereby becoming easier to be accommodated and rotated in the seat cushion 2 side.

In the above embodiment, the support base 40 is fixed to the vehicle body floor via the rail devices 4, but not limited thereto, the support base 40 may be appropriately changed to be fixed directly to the vehicle body floor without the rail devices 4, for example. Moreover, without the connecting brackets 11, the seat back 1 and the support base 40 may be directly connected via the seat pivot shaft 12. Further, without the support base 40, the seat back 1 may be connected to the seat pivot shaft 12 fixed on the vehicle body floor to be pivotable.

In the above embodiment, one abutting surface of the base abutting portion 64 and the cushion abutting portion 71 is desirable to be formed to have a lower coefficient of friction than the other abutting surface. By such a configuration, when the base cover 60 and the cushion cover 70 abut, it is possible to suppress scratches or damages to each other. Moreover, the leg movement restricting portion 63 of the base cover 60 is desirable to be formed to have a relatively low coefficient of friction similarly. By such a configuration, when the detachable leg 30 and the leg movement restricting portion 63 contact, it is possible to suppress scratches or damage to each other.

In the above embodiment, the vehicle seat capable of housing used for automobiles has been described as a particular example, but not limited thereto, the vehicle seat can be used as a seat for vehicles such as aircrafts and ships, in addition to vehicle seats for trains, busses and the like.

In the present embodiment, the vehicle seat S according to the present disclosure has been mainly described. However, the above embodiment is merely an example to facilitate understanding of the present disclosure, and some embodiments of the present disclosure are not limited thereto. The embodiments of the present disclosure can be changed and improved without departing from the gist thereof, and as a matter of course, the present disclosure includes equivalents thereof. In particular, the shape, arrangement, and configuration of the detachable leg 30, the support base 40, the leg holding member 50, the base cover 60, and the cushion cover 70, and the particular configuration of the leg guide portion which are described in the above embodiment are merely an example, and the present disclosure is not limited thereto.

TABLE OF REFERENCE NUMERALS

S, S2: Vehicle seat
1: Seat back
    1a, 2a, 3a: Cushion pad
    1b, 2b, 3b: Skin
2: Seat cushion
3: Headrest
4: Rail device (mounting member)
    4a: Lower rail
    4b: Upper rail
10: Back frame
11: Connecting bracket
12: Seat pivot shaft
13: Reclining device
14: Spiral spring
20: Cushion frame
21: Side frame
22: Front connecting pipe
23: Central connecting pipe
24: Pan frame
25: Cushion pivoting device
26: Cushion pivot shaft
27: Spiral spring
28: Leg pivoting device
    28a: Leg pivot shaft
    28b: Spring member
30: Detachable leg
31: Leg main body portion
32: Leg connection portion
40: Support base (mounting member)
41: Side base portion
    41a: Connecting wall portion
    41b: Inner wall portion
    41c: Outer wall portion
    41d: Notch portion
42: First base connection portion
43: Second base connection portion
44: Reinforcing base portion
    44a: Connecting wall portion
    44b: Inner wall portion
    44c: Outer wall portion
45: Holding member support portion
    45a: Folded portion
50: Leg holding member
51: Side wall portion
52: Bottom wall portion
53: Curl portion
54: Internal locking device
60: Base cover
61: Front cover portion
62: Leg accommodating concave portion
    62a, 62b: Side wall portion
    62c: Bottom wall portion
63: Leg movement restricting portion, leg guide portion
    63a: Protruding portion
64: Base abutting portion
65: Reinforcing rib
66: Leg movement inhibiting portion
67: Lever abutting portion
68: Rear cover portion
70: Cushion cover
71: Cushion abutting portion
80: Lock-off device
81: Lock-off lever

The invention claimed is:

1. A vehicle seat configured to switch between a usage state where an occupant can sit and a movement state where a seat main body of the vehicle seat is moved from the usage state, the vehicle seat comprising:

the seat main body, having a seat back that is a backrest portion, and a seat cushion that is a seating portion;

a mounting member configured to mount the seat main body on a vehicle body floor; and a base cover that covers the mounting member, wherein:

the seat cushion comprises a cushion abutting portion provided on a surface of the seat cushion on a base cover side of the seat cushion;

the base cover comprises a base abutting portion provided on a surface of the base cover on a seat cushion side of the base cover; and the cushion abutting portion abuts the base abutting portion when the seat main body moves between the usage state and the usage state.

2. The vehicle seat according to claim 1, wherein:

the seat main body is configured to be moved to a housing floor surface of the vehicle body floor in the movement state; and a front portion of the seat cushion abuts the housing floor surface when the seat main body moves between the usage state and the movement state.

3. The vehicle seat according to claim 1, wherein:

the base cover includes a concave portion; and the base abutting portion is arranged in one end portion of an upper surface of the base cover in a seat width direction and on an outer side of the concave portion in the seat width direction.

4. The vehicle seat according to claim 1, wherein the base abutting portion has a convex shaped curved surface that projects towards the seat cushion.

5. The vehicle seat according to claim 1, wherein:

the base cover comprises a front cover portion and a rear cover portion; and the front cover portion and the rear cover portion are snap-fit coupled.

6. The vehicle seat according to claim 3, wherein:

the base cover comprises a front cover portion and a rear cover portion; and the front cover portion includes the concave portion.

7. The vehicle seat according to claim 1, wherein a reinforcing portion is formed on a back surface of the base abutting portion in the base cover.

8. The vehicle seat according to claim 1, wherein the base cover comprises a concave portion.

9. The vehicle seat according to claim 8, wherein:

the base cover comprises a front cover portion and a rear cover portion; and the front cover portion and the rear cover portion are coupled in a rear of the concave portion.

10. The vehicle seat according to claim 8, further comprising:

a headrest, wherein the headrest is arranged in front of the concave portion in the movement state.

11. The vehicle seat according to claim 8, wherein:

the seat cushion is the seating portion and is configured to support the occupant from below, and comprises a cushion frame that is a framework of the seat cushion, a cushion pad that is placed on the cushion frame, and a skin that covers the cushion pad;

the vehicle seat further comprises a reclining device that connects the seat back to the mounting member pivotally around a seat pivot shaft; and the concave portion is arranged on an inner side of the reclining device in a seat width direction.

12. The vehicle seat according to claim 1, wherein an abutting surface of one of the cushion abutting portion and the base abutting portion has a lower coefficient of friction than an abutting surface of another of the cushion abutting portion and the base abutting portion.

13. The vehicle seat according to claim 1, wherein the mounting member is a rail device that movably supports the seat main body.

14. A vehicle seat configured to switch between a usage state where an occupant can sit and a movement state where a seat main body of the vehicle seat is moved from the usage state, the vehicle seat comprising:
- the seat main body having a seat back that is a backrest portion, and a seat cushion that is a seating portion;
- a rail device that movably supports the seat main body; and
- a base cover that covers the rail device, wherein:
- the seat cushion comprises a cushion abutting portion provided on a surface of the seat cushion on a base cover side of the seat cushion;
- the base cover comprises a base abutting portion provided on a surface of the base cover on a seat cushion side of the base cover; and
- the cushion abutting portion abuts the base abutting portion when the seat main body moves between the usage state and the usage state.

15. The vehicle seat according to claim 14, wherein:
- the seat main body is configured to be moved to a housing floor surface of the vehicle body floor in the movement state; and
- a front portion of the seat cushion abuts the housing floor surface when the seat main body moves between the usage state and the movement state.

16. The vehicle seat according to claim 14, wherein the base cover comprises a concave portion.

17. The vehicle seat according to claim 16, wherein:
- the base cover comprises a front cover portion and a rear cover portion; and
- the front cover portion includes the concave portion.

18. The vehicle seat according to claim 16, wherein:
- the seat cushion is the seating portion and is configured to support the occupant from below, and comprises a cushion frame that is a framework of the seat cushion, a cushion pad that is placed on the cushion frame, and a skin that covers the cushion pad;
- the vehicle seat further comprises a reclining device that connects the seat back to the mounting member pivotally around a seat pivot shaft; and
- the concave portion is arranged on an inner side of the reclining device in a seat width direction.

19. The vehicle seat according to claim 14, wherein the base abutting portion has a convex shaped curved surface that projects to the seat cushion.

20. The vehicle seat according to claim 14, wherein:
- the base cover comprises a front cover portion and a rear cover portion; and
- the front cover portion and the rear cover portion are snap-fit coupled.

* * * * *